(12) United States Patent
Young

(10) Patent No.: US 12,738,831 B1
(45) Date of Patent: Sep. 15, 2026

(54) SYSTEMS AND METHODS FOR SWITCH DRIVER FOR POWER CONVERTER FOR ELECTRIC VEHICLE

(71) Applicant: BorgWarner Inc., Auburn Hills, MI (US)

(72) Inventor: Brian L. Young, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 19/078,777

(22) Filed: Mar. 13, 2025

(51) Int. Cl.
*H02M 1/00* (2007.01)
*B60L 53/22* (2019.01)

(52) U.S. Cl.
CPC ........... *H02M 1/0029* (2021.05); *B60L 53/22* (2019.02); *H02M 1/0009* (2021.05)

(58) Field of Classification Search
None
See application file for complete search history.

(56) References Cited

U.S. PATENT DOCUMENTS

2002/0070772 A1* 6/2002 Neacsu ................ H03K 17/166 327/108
2004/0130923 A1* 7/2004 Yin Ho ................ H02M 5/458 363/131
2013/0181750 A1* 7/2013 Lobsiger .......... H03K 17/08148 327/109
2024/0364253 A1* 10/2024 Khan ...................... H02P 27/06

* cited by examiner

*Primary Examiner* — Daniel C Puentes
*Assistant Examiner* — Aqeel H Bukhari
(74) *Attorney, Agent, or Firm* — Joshua M. Haines; Bookoff McAndrews, PLLC

(57) ABSTRACT

A system includes a power converter, wherein the power converter includes: a switch; and one or more controllers configured to control an operation of the switch; wherein the one or more controllers include: a first feedback loop configured to detect a change in voltage of the switch; a second feedback loop configured to detect a change in current of the switch; and a switch driver configured to generate a control signal for the switch, based on the change in voltage detected by the first feedback loop and the change in current detected by the second feedback loop.

20 Claims, 16 Drawing Sheets

500
REGIONS OF GATE CURRENT PROFILE

▶ TURN ON

- REGION 1: DRIVE TO PLATEAU
- REGION 2: CONTROL $I_{DS}$ SLEW RATE, ($I_{DS}$ → MAX)
- REGION 3: CONTROL $V_{DS}$ SLEW RATE, ($V_{DS}$ → MIN)
- REGION 4: DRIVE TO FULL ENHANCEMENT

▶ TURN OFF

- REGION 1: DRIVE TO PLATEAU
- REGION 2: CONTROL $V_{DS}$ SLEW RATE, ($V_{DS}$ → MAX)
- REGION 3: CONTROL $I_{DS}$ SLEW RATE, ($I_{DS}$ → 0)
- REGION 4: DRIVE TO FULL CUT OFF

700

900

SYSTEMS AND METHODS FOR SWITCH DRIVER FOR POWER CONVERTER FOR ELECTRIC VEHICLE

TECHNICAL FIELD

Various embodiments of the present disclosure relate generally to systems for controlling a switch for a power converter, and, more particularly, to systems and methods for generating and implementing an operating profile for a switch for a power converter for an electric vehicle.

BACKGROUND

Power converters, such as used in electric vehicles, for example, may utilize controllers, such as switch drivers, for example, to operate a switch (e.g., transistor) of the power converter. These switch drivers may not be optimized under various operating conditions of the switch. Absence of such optimization may result in increased cost or decreased efficiency of a power converter.

The present disclosure is directed to overcoming one or more of these above-referenced challenges.

SUMMARY OF THE DISCLOSURE

In some aspects, the techniques described herein relate to a system including a power converter, wherein the power converter includes: a switch; and one or more controllers configured to control an operation of the switch based on a dual-loop feedback control profile.

In some aspects, the techniques described herein relate to a system, wherein the one or more controllers includes a switch driver configured to generate a control signal for the switch, based on the dual-loop feedback control profile.

In some aspects, the techniques described herein relate to a system, wherein the dual-loop feedback control profile includes information for the one or more controllers to independently drive each of a current and a voltage of the switch.

In some aspects, the techniques described herein relate to a system, wherein the one or more controllers are configured to operate the switch in a first region, a second region, a third region, and a fourth region.

In some aspects, the techniques described herein relate to a system, wherein the dual-loop feedback control profile includes information for the one or more controllers to drive a current in one or more regions of the operation of the switch.

In some aspects, the techniques described herein relate to a system, wherein the dual-loop feedback control profile includes information for the one or more controllers to drive a voltage in one or more regions of the operation of the switch.

In some aspects, the techniques described herein relate to a system, wherein the dual-loop feedback control profile includes information for the one or more controllers to independently drive each of a current and a voltage of the switch in more than one region of the operation of the switch.

In some aspects, the techniques described herein relate to a system, wherein the dual-loop feedback control profile includes information for the one or more controllers to drive a current slew rate in one or more regions of the operation of the switch.

In some aspects, the techniques described herein relate to a system, wherein the dual-loop feedback control profile includes information for the one or more controllers to drive a voltage slew rate in one or more regions of the operation of the switch.

In some aspects, the techniques described herein relate to a system, wherein the one or more controllers are configured to control the operation of the switch by controlling a gate current of the switch based on the dual-loop feedback control profile.

In some aspects, the techniques described herein relate to a system, wherein the dual-loop feedback control profile is a gate driver profile.

In some aspects, the techniques described herein relate to a system, further including: a battery connected to the power converter; and a motor connected to the power converter, wherein the system is provided as an electric vehicle.

In some aspects, the techniques described herein relate to a system including: one or more controllers configured to control an operation of a switch based on a dual-loop feedback control profile.

In some aspects, the techniques described herein relate to a system, wherein the one or more controllers are further configured to control the operation of the switch based on system environment information.

In some aspects, the techniques described herein relate to a system, wherein the system environment information includes one or more of temperature or percentage of drain-to-source current of the switch.

In some aspects, the techniques described herein relate to a method including: generating a control signal for a switch, based on a dual-loop feedback control profile.

In some aspects, the techniques described herein relate to a method, wherein the generating the control signal further includes: generating a first region signal for the switch based on the dual-loop feedback control profile; generating a second region signal for the switch based on the dual-loop feedback control profile; generating a third region signal for the switch based on the dual-loop feedback control profile; and generating a fourth region signal for the switch based on the dual-loop feedback control profile.

In some aspects, the techniques described herein relate to a method, wherein: the generating the first region signal for the switch includes driving a first current for the switch to a first plateau, the generating the second region signal for the switch includes controlling a voltage slew rate for the switch, the generating the third region signal for the switch includes controlling a current slew rate for the switch, and the generating the fourth region signal for the switch includes driving the first current for the switch to a second plateau.

In some aspects, the techniques described herein relate to a method, wherein: the generating the first region signal for the switch includes driving a first current for the switch to a first plateau, the generating the second region signal for the switch includes controlling a current slew rate for the switch, the generating the third region signal for the switch includes controlling a voltage slew rate for the switch, and the generating the fourth region signal for the switch includes driving the first current for the switch to a second plateau.

In some aspects, the techniques described herein relate to a method, further including: transitioning from the generating the second region signal to the generating the third region signal, wherein a timing of the transitioning is based on the dual-loop feedback control profile.

In some aspects, the techniques described herein relate to a system including a power converter, wherein the power converter includes: a switch including a control input; a current source configured to provide a current control signal to the control input of the switch; a voltage source configured to provide a voltage control signal to the control input of the switch; and a resistor connected to the control input of the switch and the voltage source.

In some aspects, the techniques described herein relate to a system, wherein the current source is configured to provide the current control signal based on a dual-loop feedback control profile.

In some aspects, the techniques described herein relate to a system, wherein the voltage source is configured to provide the voltage control signal based on a dual-loop feedback control profile.

In some aspects, the techniques described herein relate to a system, wherein a resistance value of the resistor is based on a dual-loop feedback control profile.

In some aspects, the techniques described herein relate to a system, wherein the control input is a gate of the switch.

In some aspects, the techniques described herein relate to a system, wherein an output of the current source is connected to the resistor and the control input of the switch.

In some aspects, the techniques described herein relate to a system, wherein the resistor is configured to reduce a ringing of the power converter.

In some aspects, the techniques described herein relate to a system, wherein the current source is configured to operate independently from the voltage source, and the control input of the switch is configured to receive the current control signal simultaneously with the voltage control signal.

In some aspects, the techniques described herein relate to a system, wherein the current control signal is configured to augment a current from the voltage source to the control input of the switch.

In some aspects, the techniques described herein relate to a system, wherein the current source is a high impedance variable current source.

In some aspects, the techniques described herein relate to a system, further including: a battery connected to the power converter; and a motor connected to the power converter, wherein the system is provided as an electric vehicle.

In some aspects, the techniques described herein relate to a system including: a current source configured to provide a current control signal to a control input of a switch; and a voltage source configured to provide a voltage control signal to the control input of the switch.

In some aspects, the techniques described herein relate to a system, further including: a resistor connected to the control input of the switch and the voltage source, wherein the current source is connected to the control input of the switch, the resistor is connected to the control input of the switch, and the voltage source is connected to the resistor.

In some aspects, the techniques described herein relate to a system further including: one or more controllers configured to control the current source and the voltage source.

In some aspects, the techniques described herein relate to a method including: generating a current control signal for a current source to a control input of a switch based on a current at the control input produced by a voltage source to the control input.

In some aspects, the techniques described herein relate to a method, wherein the generating the current control signal is further based on a dual-loop feedback control profile.

In some aspects, the techniques described herein relate to a method, wherein the current at the control input is produced by the voltage source based on a dual-loop feedback control profile.

In some aspects, the techniques described herein relate to a method, wherein the generating the current control signal for the current source with the current at the control input produced by the voltage source generates a hybrid switch driver signal for the switch.

In some aspects, the techniques described herein relate to a method, further including: determining a resistance value of a resistor for the voltage source based on a dual-loop feedback control profile.

In some aspects, the techniques described herein relate to a method, further including: generating a voltage control signal for the voltage source to produce the current at the control input, wherein the generating the voltage control signal is based on a dual-loop feedback control profile.

In some aspects, the techniques described herein relate to a system including a power converter, wherein the power converter includes: a switch; and one or more controllers configured to control an operation of the switch; wherein the one or more controllers include: a first feedback loop configured to detect a change in voltage of the switch; a second feedback loop configured to detect a change in current of the switch; and a switch driver configured to generate a control signal for the switch, based on the change in voltage detected by the first feedback loop and the change in current detected by the second feedback loop.

In some aspects, the techniques described herein relate to a system, wherein the control signal includes: a voltage signal based on the change in voltage detected by the first feedback loop, and a current signal based on the change in current detected by the second feedback loop.

In some aspects, the techniques described herein relate to a system, wherein the one or more controllers are further configured to generate a dual-loop feedback control profile for the switch based on the control signal for the switch.

In some aspects, the techniques described herein relate to a system, wherein the dual-loop feedback control profile includes: a first region signal; a second region signal; a third region signal; and a fourth region signal.

In some aspects, the techniques described herein relate to a system, wherein: the first region signal is configured to drive a current to a first plateau, the second region signal is configured to control a current slew rate, the third region signal is configured to control a voltage slew rate, and the fourth region signal is configured to drive the current to a second plateau.

In some aspects, the techniques described herein relate to a system, wherein: the first region signal is configured to drive a current to a first plateau, the second region signal is configured to control a voltage slew rate, the third region signal is configured to control a current slew rate, and the fourth region signal is configured to drive the current to a second plateau.

In some aspects, the techniques described herein relate to a system, wherein: the first feedback loop includes a first transconductor, and the second feedback loop includes a second transconductor.

In some aspects, the techniques described herein relate to a system, wherein the first feedback loop is configured to generate a first feedback signal based on the change in voltage detected by the first feedback loop, and wherein the second feedback loop is configured to generate a second feedback signal based on the change in current detected by the second feedback loop.

In some aspects, the techniques described herein relate to a system, wherein the control signal includes a combination of the first feedback signal and the second feedback signal.

In some aspects, the techniques described herein relate to a system, further including: a battery connected to the power converter; and a motor connected to the power converter, wherein the system is provided as an electric vehicle.

In some aspects, the techniques described herein relate to a system including one or more controllers, the one or more controllers including: a first feedback loop configured to detect a change in voltage of a switch; a second feedback loop configured to detect a change in current of the switch; and a switch driver configured to generate a control signal for the switch, based on the change in voltage detected by the first feedback loop and the change in current detected by the second feedback loop.

In some aspects, the techniques described herein relate to a system, wherein one or more of the first feedback loop, the second feedback loop, and the switch driver are implemented as software in the one or more controllers.

In some aspects, the techniques described herein relate to a system, wherein one or more of the first feedback loop, the second feedback loop, and the switch driver are implemented as a hardware circuit including one or more of a transconductor, a differentiator, or an adder.

In some aspects, the techniques described herein relate to a system, wherein: the first feedback loop includes a first adder connected to the differentiator, and a first transconductor connected to the differentiator, and the second feedback loop includes a second adder connected to a second transconductor.

In some aspects, the techniques described herein relate to a method including: generating a first feedback loop signal based on a change in voltage of a switch; generating a second feedback loop signal based on a change in current of the switch; and generating a control signal for the switch, based on the first feedback loop signal and the second feedback loop signal.

In some aspects, the techniques described herein relate to a method, wherein: detecting a change in voltage signal in response to the generated control signal; detecting a change in current signal in response to the generated control signal; generating the first feedback loop signal in response to the generated control signal and the detected change in current signal; and generating the second feedback loop signal in response to the generated control signal and the detected change in voltage signal.

In some aspects, the techniques described herein relate to a method, further including: generating a dual-loop feedback control profile for the switch based on the control signal.

In some aspects, the techniques described herein relate to a method, wherein the generating the dual-loop feedback control profile includes generating a turn-on control profile for the switch and generating a turn-off control profile for the switch.

In some aspects, the techniques described herein relate to a method, wherein the generating the control signal includes generating a first region signal, generating a second region signal, generating a third region signal, and generating a fourth region signal.

In some aspects, the techniques described herein relate to a method, wherein: the generating the first region signal includes generating a control signal to drive the current of the switch to a first plateau, the generating the second region signal includes generating a control signal to control a first voltage slew rate and a first current slew rate of the switch, the generating the third region signal includes generating a control signal to control a second voltage slew rate and a second current slew rate of the switch, and the generating the fourth region signal includes generating a control signal to drive the current of the switch to a second plateau.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
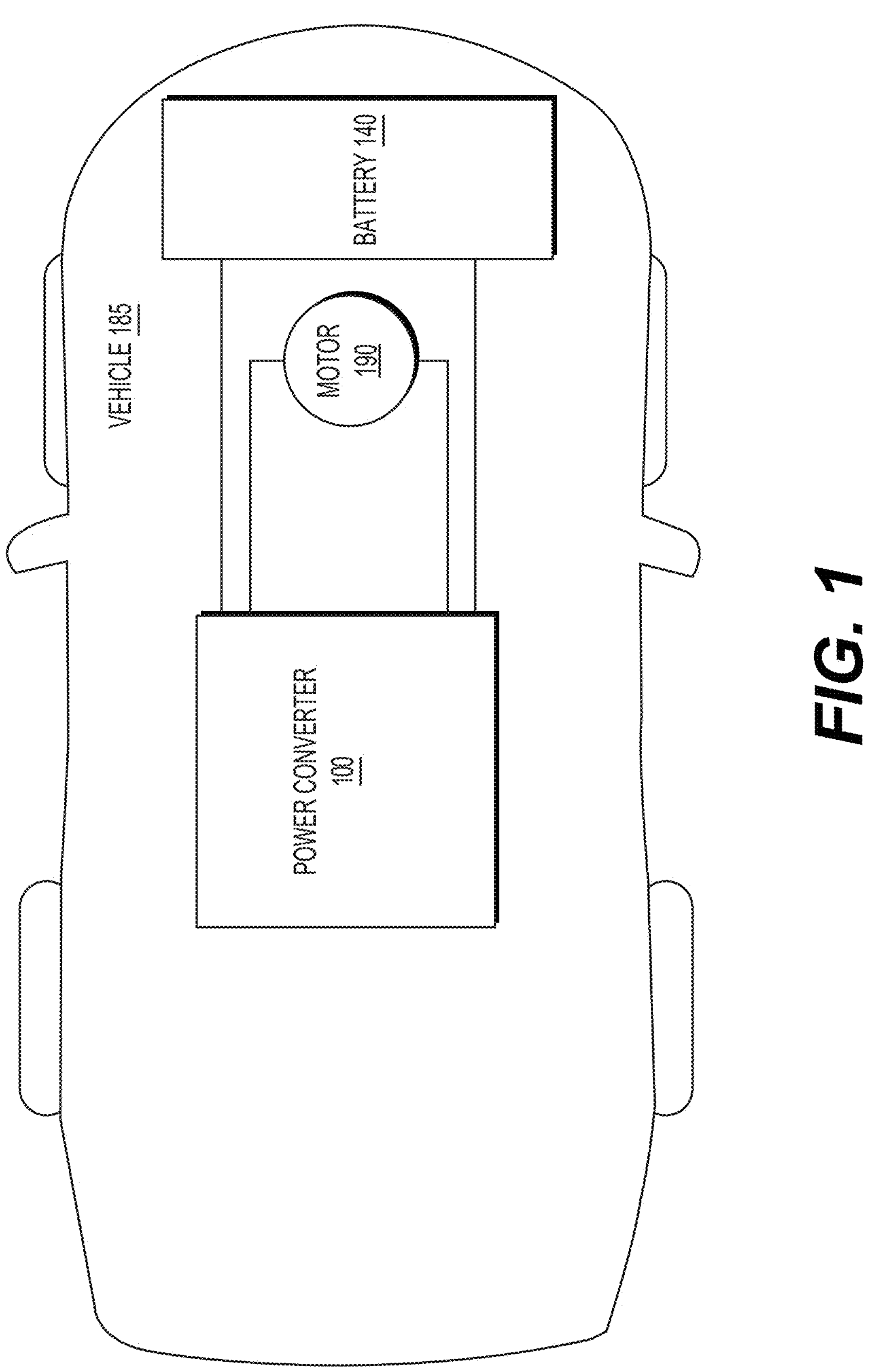
FIG. 1 depicts an exemplary system infrastructure for a vehicle including a power converter, according to one or more embodiments.

Both the foregoing general description and the following detailed description are exemplary and explanatory only and are not restrictive of the features, as claimed. As used herein, the terms “comprises,” “comprising,” “has,” “having,” “includes,” “including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems for controlling a switch for a power converter, and, more particularly, to systems and methods for generating and implementing an operating profile for a switch for a power converter for an electric vehicle. In the context of this disclosure, a switch driver may be referred to as a gate driver as an example of a controller for a gate of a transistor that includes a gate. However, the disclosure is not limited to a transistor with a gate, and may be applied to a switch controller (i.e., switch driver, gate driver) for any switch that includes a control connection to control a flow of current from a first power connection of the switch to a second power connection of the switch.

A power converter according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Power FET gate drivers may include resistor-based gate drivers and current-mode gate drivers. Gate drivers may not optimize power FET switching efficiency under all operating conditions. Resistor-based gate drivers may not be able to simultaneously control $dI_{DS}/dt$ and $dV_{DS}/dt$ or be able to adapt the gate current profile. A current-mode DAC (digital-to-analog) profile may not be adjusted during a switching event. Neither technique may be able to safely operate a power FET at an optimal point under all conditions.

One or more problems of resistor-based and current DAC-based gate drivers may be mitigated by one or more embodiments of the proposed technique through, for example, active control of $dV_{DS}/dt$ and $dI_{DS}/dt$ slew rates using dual feedback loops operating in negative feedback to generate one or more gate current profiles for various power FET operating regions and conditions (i.e. drain current, temperature, etc.). One or more embodiments may provide one or more controllers providing active control of a voltage slew rate or a current slew rate. One or more embodiments may provide one or more controllers to drive a current or a voltage of a switch in more than one region including one or more regions of the operation of the switch. One or more embodiments may provide generating a control signal including generating a first region signal, a second region signal, a third region signal, and a fourth region signal for a switch based on a dual-loop feedback control profile.

One or more embodiments may provide dual-loop feedback control. Dual-loop feedback control may use negative feedback, which may include safe and accurate FET operation. One or more embodiments may generate one or more gate current profiles for all operating environment conditions, which may include $-V_{BATT}$, $I_{MOTOR}$, $T_J$, #FET(s), etc. One or more embodiments may increase drain current and increase drain voltage slew rates which may reduce switching losses. One or more embodiments may include optimization of $dI_{DS}/dt$ (a change in current at the switch over time) independently of $dV_{DS}/dt$ (a change in voltage at the switch over time). One or more embodiments may provide separately optimizing Turn ON and Turn OFF profiles.

One or more embodiments may include regions of a gate current profile. One or more embodiments may include regions of a gate current profile for a Turn ON operation. For example, one or more embodiments may include, for example, a Region 1, Drive to plateau, a Region 2: Control $I_{DS}$ slew rate, ($I_{DS}$→max), a Region 3: Control $V_{DS}$ slew rate, ($V_{DS}$→min), and a Region 4: Drive to full enhancement.

One or more embodiments may include regions of a gate current profile for a Turn OFF operation. For example, one or more embodiments may include, for example, a Region 1: Drive to plateau, a Region 2: Control $V_{DS}$ slew rate, ($V_{DS}$→max), a Region 3: Control $I_{DS}$ slew rate, ($I_{DS}$→0), and a Region 4: Drive to cut-off.

One or more embodiments may include Turn ON Control. One or more embodiments may include initial conditions, for example, drain source current ($I_{DS}$) where $I_{DS}=0$, drain source voltage ($V_{DS}$) $V_{DS}=V_{BATT}$ (where $V_{BATT}$ represents battery voltage), a first transconductor ($G_{m1}$) where $G_{m1}$ source current range may include $[0, I_{G\_max}]$, and a second transconductor ($G_{m2}$) where $G_{m2}$ source current range may include $[-I_{G\_max}, 0]$. The disclosure is not limited to a transconductor, and other components that receive a first signal and a second signal and provide an output may be used. One or more embodiments may provide sending a control-on signal, (for example, Assert ctrl_ON), detect and feedback $dI_{DS}/dt$ (w/Ls) and $dV_{DS}/dt$ information, $I_{DS}$ may increase from 0 to $I_{MOTOR}$, and then $V_{DS}$ may decrease from $V_{BATT}$ to $I_{MOTOR}*R_{ON}$. One or more embodiments may provide a result which may limit $dI_{DS}/dt$ and $dV_{DS}/dt$ to safe maximum values.

One or more embodiments may include Turn ON Control: Gate Current Waveforms. For example, one or more embodiments may provide sending a control-on signal at a time 1 (for example, Assert ctrl_ON at 1). At this time, $dI_{DS}/dt$ and $dV_{DS}/dt$ may be equal to zero (for example, $dI_{DS}/dt$ and $dV_{DS}/dt=0$), $I_{G1}$ may increase to a maximum value and $I_{G2}$ may be equal to zero, (for example, $I_{G1}$→max, $I_{G2}=0$), and $V_{GS}$ may reach a plateau at a time 2. One or more embodiments may include from a region (or period of time) from time 2 to a time 3, where $I_{G1}$ may decrease, $I_{DS}$ may increase to a maximum value. During this period, one or more embodiments may provide $G_{M1}$ FB loop active and limits $dI_{DS}/dt$. One or more embodiments may provide at a time 3, $I_{DS}$=may equal a maximum value (for example, $I_{DS}$=max), and $I_{G1}$ may equal a maximum value (for example, $I_{G1}$=max), and $V_{DS}$ may decrease. One or more embodiments may provide from a time 3 to a time 4, $I_{G2}$ may decrease, and $V_{DS}$ may be driven to a minimum value, (for example, $V_{DS}$→min). During this period, $G_{m2}$ may sink excess $I_{G1}$, and may limit $dV_{DS}/dt$. One or more embodiments may provide from a time 4 to a time 5, $I_G$ may be a maximum value. During this period, $M_1$ may be driven to full enhancement.

One or more embodiments may include Turn OFF control. One or more embodiments may include initial conditions where $I_{DS}$ equals the current of the more ($I_{MOTOR}$), $V_{DS}$ may be equal to $I_{MOTOR}$ multiplied by $R_{ON}$ (for example, $I_{DS}=I_{MOTOR}$, $V_{DS}=I_{MOTOR}*R_{ON}$), transconductor $G_{m1}$ source current range may be $[-I_{G\_max}, 0]$, and transconductor $G_{m2}$ source current range may be $[0, I_{G\_max}]$. One or more embodiments may provide general operation steps including 1. Assert ctrl_OFF, 2. Detect and feedback $dI_{DS}/dt$ (w/Ls) and $dV_{DS}/dt$ information, and 3. $V_{DS}$ increases from $I_{MOTOR}*R_{ON}$ to $V_{BATT}$, then $I_{DS}$ decreases from $I_{MOTOR}$ to 0. One or more embodiments may provide as a result limiting $dV_{DS}/dt$ and $dI_{DS}/dt$ to safe maximum values.

One or more embodiments may include Turn OFF control: Gate Current Waveforms. For example, one or more embodiments may provide asserting a control-off signal at a time 1, (for example, Assert ctrl_OFF at 1). One or more embodiments may provide $dI_{DS}/dt$ and $dV_{DS}/dt$ equal to zero (for example, $dI_{DS}/dt$ and $dV_{DS}/dt=0$), $I_{G1}$ may decrease towards a minimum (for example, $I_{G1}$→min) and $I_{G2}$ may be equal to zero (for example, $I_{G2}=0$), and Vas may reach a plateau at a time 2. One or more embodiments may provide from time 2 to a time 3, $I_{G1}$ may be equal to a minimum (for example, $I_{G1}$=min), and $I_{G2}$ may increase. During this period, one or more embodiments may provide transconductor $G_{m2}$ may source excess $I_{G1}$, and may limit $dV_{DS}/dt$.

One or more embodiments may provide at a time 3, $V_{DS}$ equal to a maximum value (for example, $V_{DS}$=max), $I_{G2}$ may be equal to zero (for example, $I_{G2}=0$), and $I_{DS}$ may decrease. One or more embodiments may provide from a time 3 to a time 4, $I_{G1}$ may decrease, and $I_{DS}$ may decrease to zero (for example, $I_{DS}$→0). During this period, one or more embodiments may provide transconductor $G_{M1}$ FB loop being active and may limit $dI_{DS}/dt$. One or more embodiments may provide from a time 4 to a time 5, $I_G$ may be equal to a minimum value (for example, $I_G$=min), and may provide driving $M_1$ to full cutoff.

One or more embodiments may provide results of dual-loop feedback control, which may include a Region 1: from a time 1 to a time 2 and may include driving to plateau, a Region 2: from a time 2 to a time 3 and may control $dI_{DS}/dt$, a Region 3: from a time 3 to a time 4 and may controls $dV_{DS}/dT$, and a Region 4: from a time 4 to a time 5 and may drive to full enhancement. One or more embodiments may provide device physics knowledge embedded in a gate current waveform.

One or more embodiments may include one or more gate current profiles for any power FET under any operating condition. One or more embodiments may independently control profiles for maximum $dI_{DS}/dt$ and $dV_{DS}/dt$. One or more embodiments may safely increase switching speed through maximizing $dI_{DS}/dt$ and $dV_{DS}/dt$. Resistor-based gate drivers may limit peak $dI_{DS}/dt$ and $dV_{DS}/dt$ for safe operation. Also, gate current may be limited by the decreasing amount of $(V_{GS\_MAX}-V_{GS})/R_G$ current available as a FET transitions between ON and OFF states. In current-DAC based approaches, the gate current profile may be only an estimate of what may be required for FET operation. Also, some-DAC based approaches may use a less aggressive profile to ensure safe FET operating conditions.

One or more embodiments may provide gate current for any FET operating condition, decreased switching times, and decreased overlap of $I_{DS}$ and $V_{DS}$ conduction, which may significantly reduce switching losses, and an increased ability to maintain FET safe operating regions.

Power FET Gate Drivers may include two architectures: 1) resistor-based gate drivers, and 2) current-mode gate drivers. Each architecture may seek to safely and efficiently switch Power FET devices; however, both methods may compromise switching efficiency for the sake of Power FET health and safety. Resistor-based gate drivers may choose one or more resistors based on the limit of maximum safe switching characteristics ($dI_{DS}/dt$ and $dV_{DS}/dt$). Multiple selectable resistors may be used, but resistors may be unable to be dynamically selected during a switching event. Thus, one resistor may be selected per switching event, and this resistor selection may not be modified practically. Current-mode gate drivers may utilize approximations of a gate such as step functions, ramp functions, and first-order RC filter functions. This approach may rely on circuits to monitor gate voltages with a goal of estimating Power FET operating regions. These circuits may be susceptible to noise, delay, mismatch, and other known circuit imperfections, which may lead to unsafe operation during transitions from one operating region to another.

Figure 5:
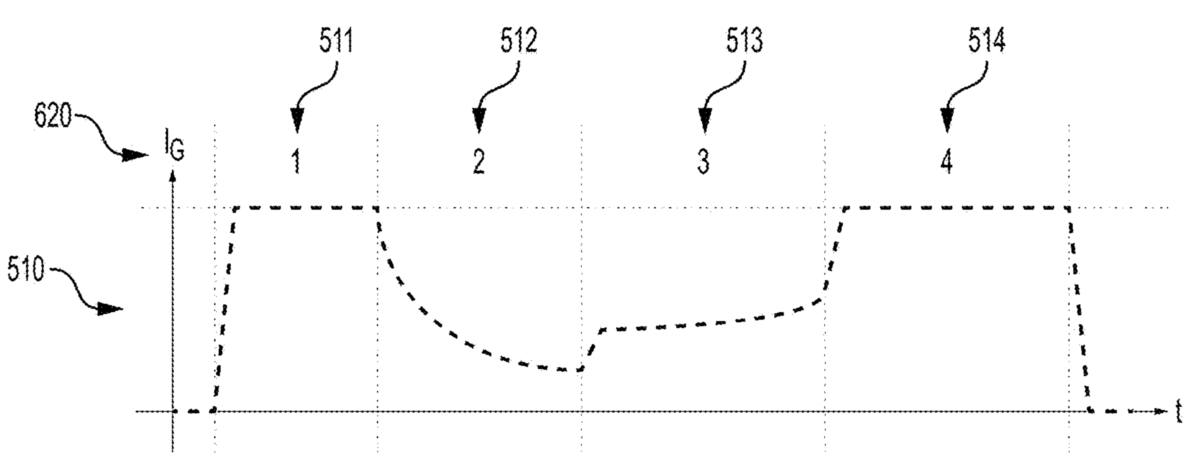
FIG. 5 depicts exemplary regions of gate current profiles, according to one or more embodiments.
Figure 5:
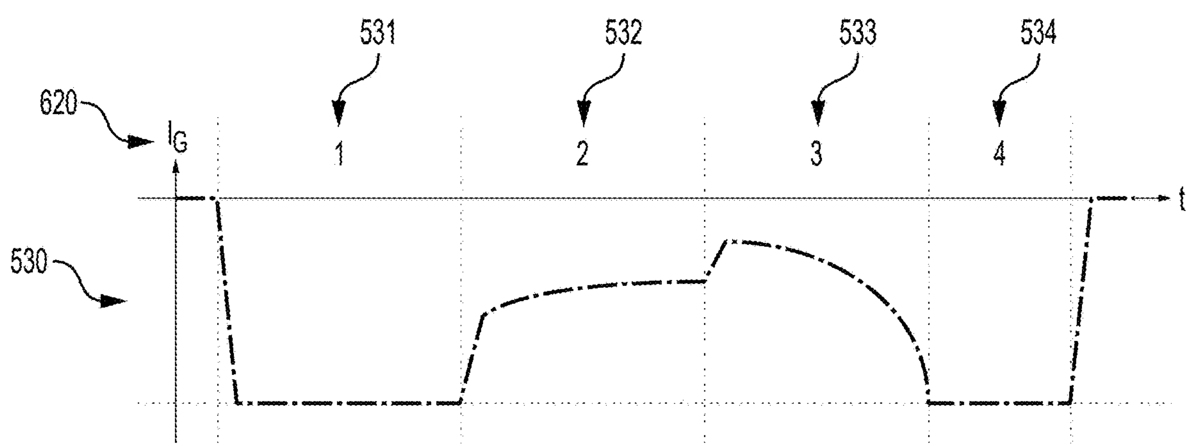
Figure 7:
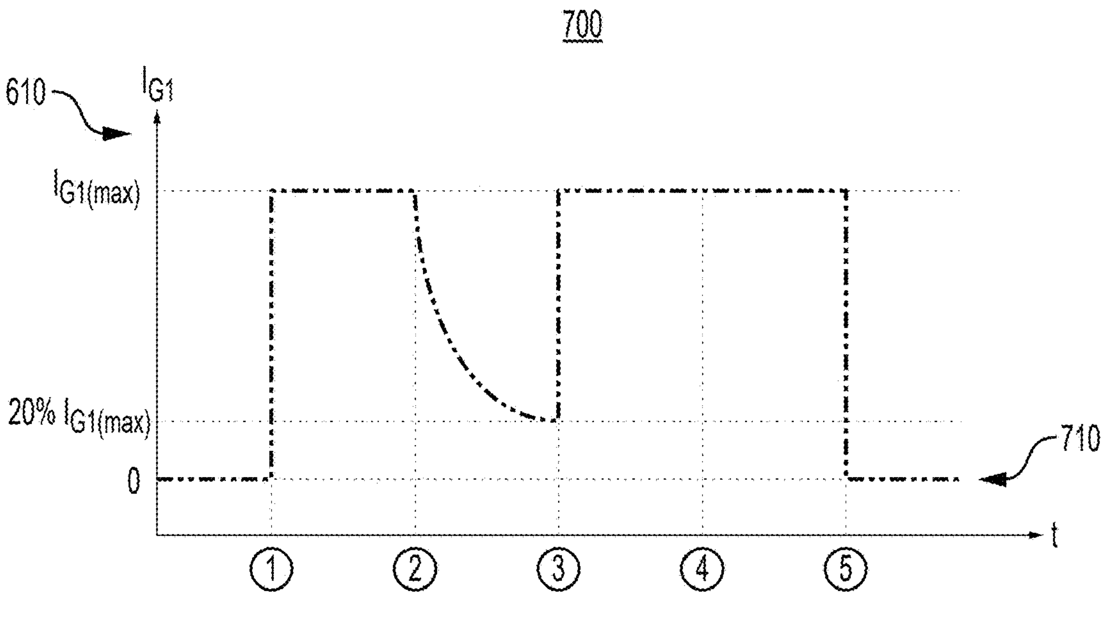
FIG. 7 depicts exemplary current waveforms of the turn-on operation, according to one or more embodiments.
Figure 7:
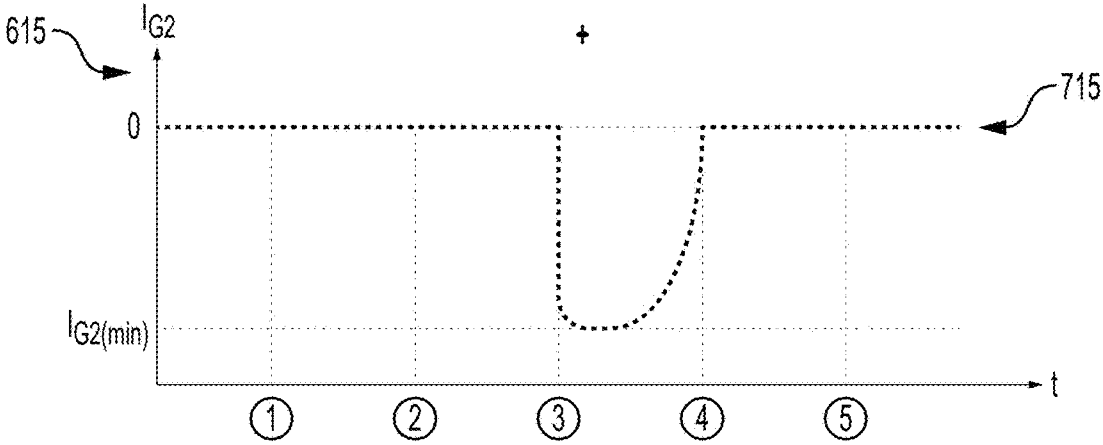
Figure 7:
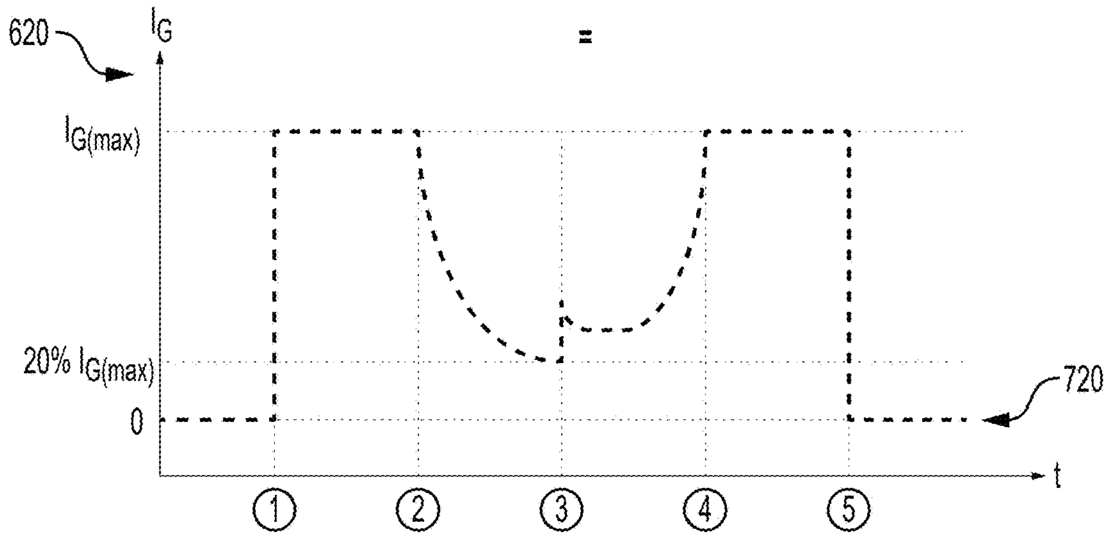

One or more embodiments may provide equation parameters used in one or more of the four operating regions. FIGS. 5 and 7 may depict one or more operating regions for turn-ON and turn-OFF switching events.

Figure 11:
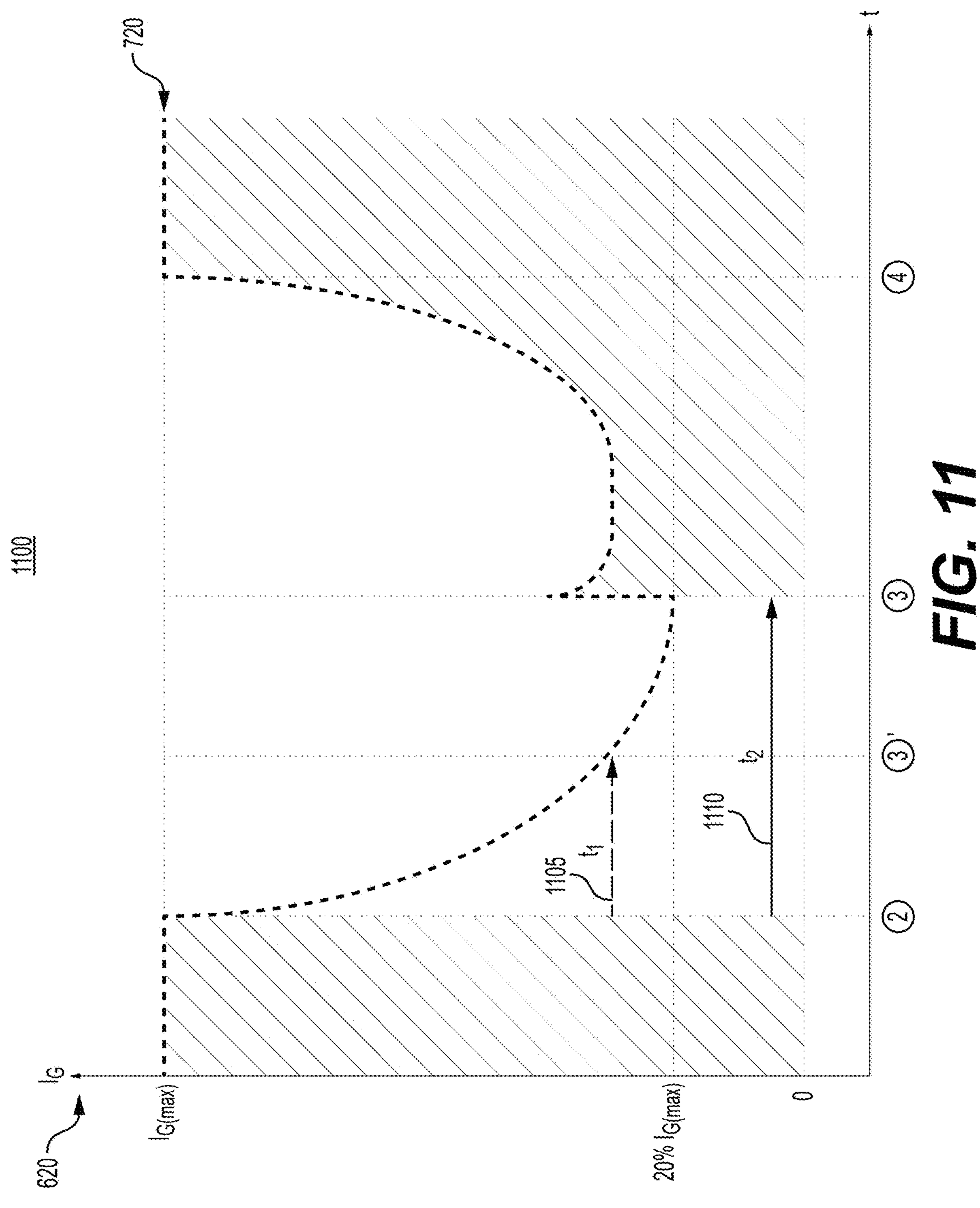
FIG. 11 depicts an exemplary slew current for the turn-on operation, according to one or more embodiments.
Figure 12:
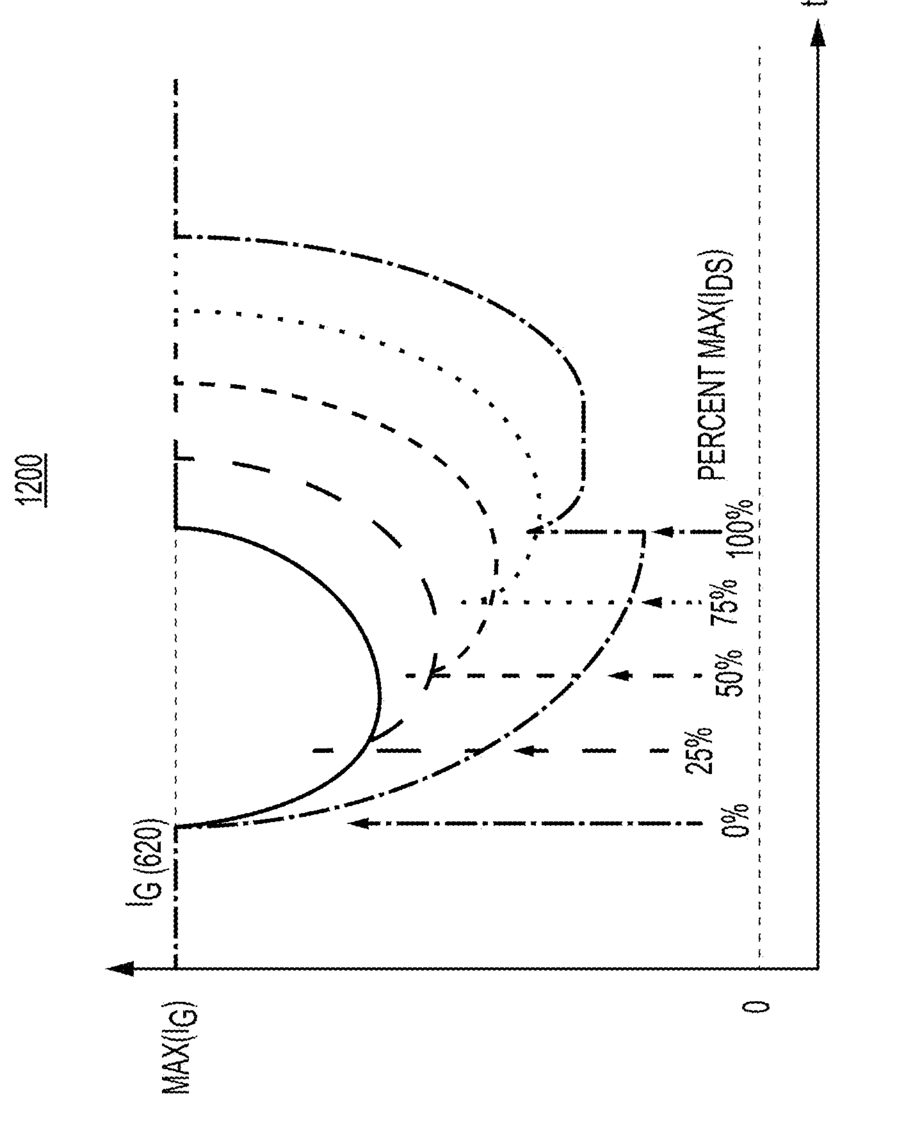
FIG. 12 depicts an exemplary gate current and multiple drain currents, according to one or more embodiments.

FIG. 11 may depict for a turn-ON profile, Region 2 that the time spent in region 2 may be proportional to Power FET drain current. FIG. 12 may depict gate current curves versus time for various drain currents. One or more embodiments may provide using the gate current transition from region 2 to region 3, and may provide that an algorithm may be developed to safely switch between the Region 2 equation to the Region 3 equation. For example, if the gate current at the end of region 2 is higher than the gate current at the start of region 3 and due to uncertainty in actual drain current, the algorithm may switch to region 3 earlier which may maintain safe Power FET operation. Conversely, if Region 3 starting gate current is higher than Region 2 gate current, then the change to region 3 may be delayed. One or more embodiments may provide these transition criteria which may provide that turn-ON $dI_{DS}/dt$ (Region 2) and turn-ON $dV_{DS}/dt$ (Region 3) may not exceed safe limits.

Figure 13:
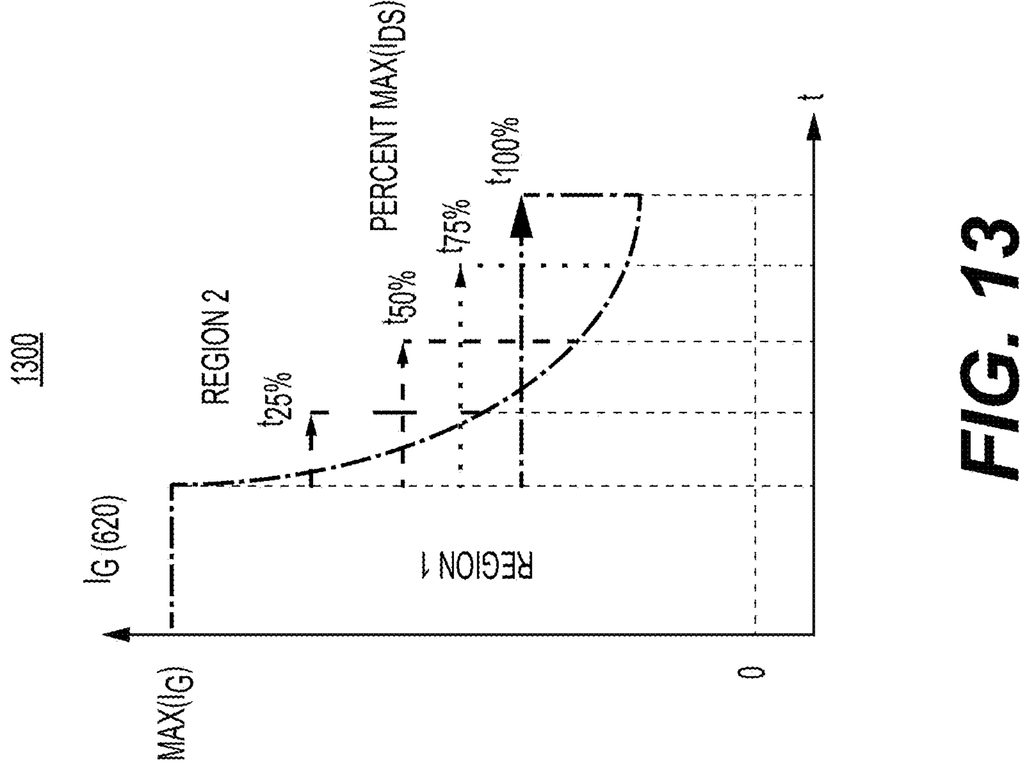
FIG. 13 depicts an exemplary gate current for multiple drain currents in a second region, according to one or more embodiments.
Figure 14:
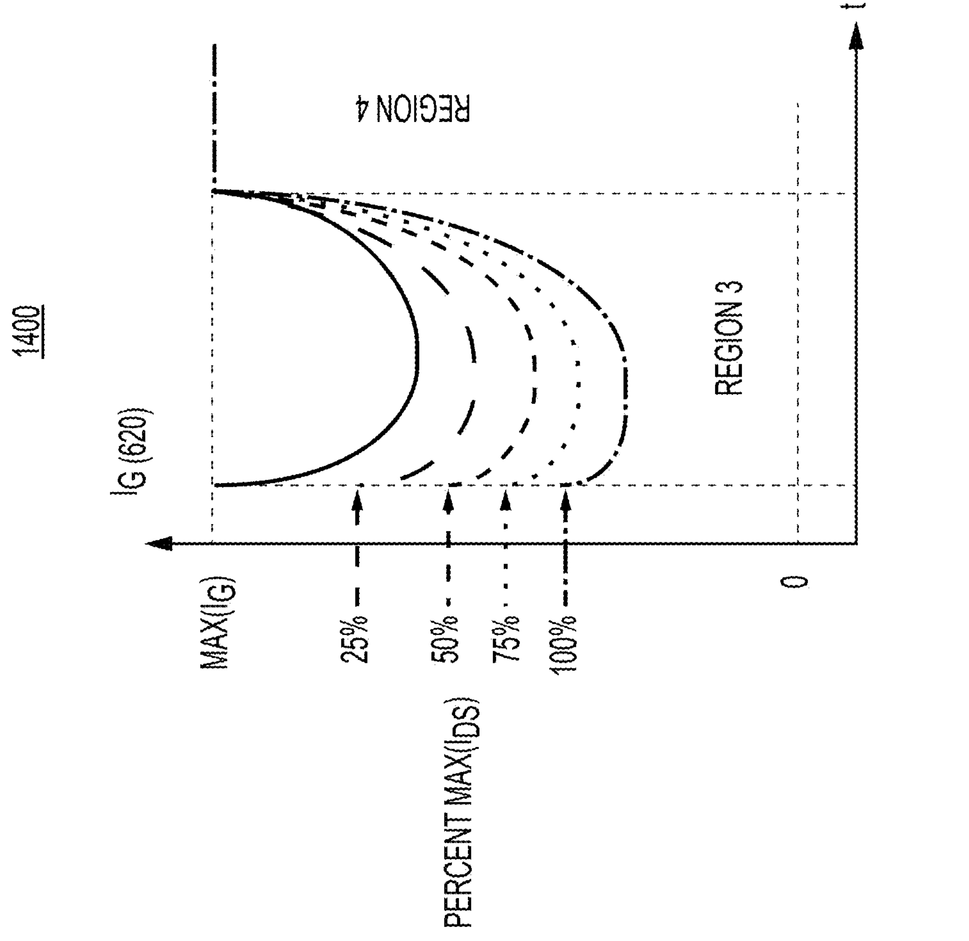
FIG. 14 depicts an exemplary gate current and multiple drain currents in a third region, according to one or more embodiments.

FIG. 13 may depict a simulated turn-ON gate current in region 2 for various drain current values, and how the gate current curve may remain consistent for any drain current. FIG. 14 may depict a simulated turn-ON gate current in region 3 for various drain current values. One or more embodiments may provide these simulation results which may suggest that Region 3 equation coefficients may have a strong dependence on drain current, but that the time spent in region 3 may be mostly dependent on battery voltage (for example, $V_{BATT}/(dV_{DS}/dt)$=constant).

One or more embodiments may provide Gate Current Profile Generation. One or more embodiments may include form equations for all four $I_G$ Regions, for example, simple, compact, and realizable equations, and open loop operation.

One or more embodiments may provide usage of gate current profile generation, for example, continuously measure/receive system environment information, which may include projected FET junction temperature, average $I_{DS}$ and $dI_{DS}/dt$, battery voltage, number of FET(s), and may include adapt $I_G$ region equations based on system environment information.

One or more embodiments may provide Gate Current Equation Variables, for example, variable t for Time (seconds) which may include Eventually quantized to high-speed clock period; variable $I_{DS}$ for Drain-to-source current [A] which may include Need to develop prediction algorithm; might receive ARMS from microcontroller; variable T for Temperature [degrees C.] which may include Projected FET temperature; variable $V_{BATT}$ for Battery Voltage which may include being received from a microcontroller and may affect $dV_{DS}/dt$; variable $dI_{DS}/dt$ for change in drain-to-source current [A/ns] which may include constant target setting, and may include a maximum; variable $dV_{DS}/dt$ for Change in drain-to-source voltage [V/ns] which may include constant target setting, and may include a maximum; variable #FET for Number of SiC FET(s) which may include Constant setting, module dependent; may include Integer multiplier of $I_G$ wave shape; and may include scaling $dI_{DS}/dt$ to keep constant the time to full scale $I_{DS}$; variable Cxss for Transistor capacitance [F] which may include transistor capacitance values Ciss, Coss, and Crss; variable Gm for Transistor transconductance [A/V] which may include Large signal transconductance; and variable $V_{th}$ for Transistor threshold voltage [V] which may include Long term aging leads to drift in $V_{th}$.

One or more embodiments may utilize knowledge of gate current waveforms and measured system data (temperature, battery voltage, drain current, etc.) and estimated system parameters (drain current, etc.) to determine new gate current profiles for each operating region for each switching event (turn-ON/OFF). One or more embodiments may also implement an algorithm to intelligently switching between operating regions at the optimal time in a safe manner.

One or more embodiments may provide a compact system to determine gate currents with region and time dependent equations (polynomial, piece-wise linear, or other appropriate fit equations) to efficiently, safely, and optimally switch Power FETs overly widely varying operating conditions.

Some methods of Power FET gate drivers may focus on resistor-based or current-mode based methods to control Power FET switching. Resistor-based gate drivers may be limited in their achievable switching efficiency due to maintaining safe switching characteristics ($dI_{DS}/dt$ and $dV_{DS}/dt$) with a single degree of freedom in order to limit peak slew rates. Current-mode gate drivers may suffer from a high output impedance current source which may not provide enough damping of the parasitic Ls*Cgs tank circuit which may lead to excessive ringing during switching events. Resistor-based gate drivers may employ multiple selectable resistors to improve switching efficiency across operating conditions. In practice, this may be limited to a few resistors due to component cost, board area, and other reasons. Current-mode gate drivers may employ a shunt damping resistance to detune the LC tank and limit oscillation.

One or more embodiments may provide the best attributes of both methods of resistor-based and current-mode gate drivers. One or more embodiments may provide a resistor-based gate driver which may provide a resistor which may be used to detune the LC tank circuit and may facilitate usage of a high impedance current source driver. One or more embodiments may provide the limited current drive ability of resistor-based gate drivers which may be augmented with additional current from the current-mode driver.

Figure 15:
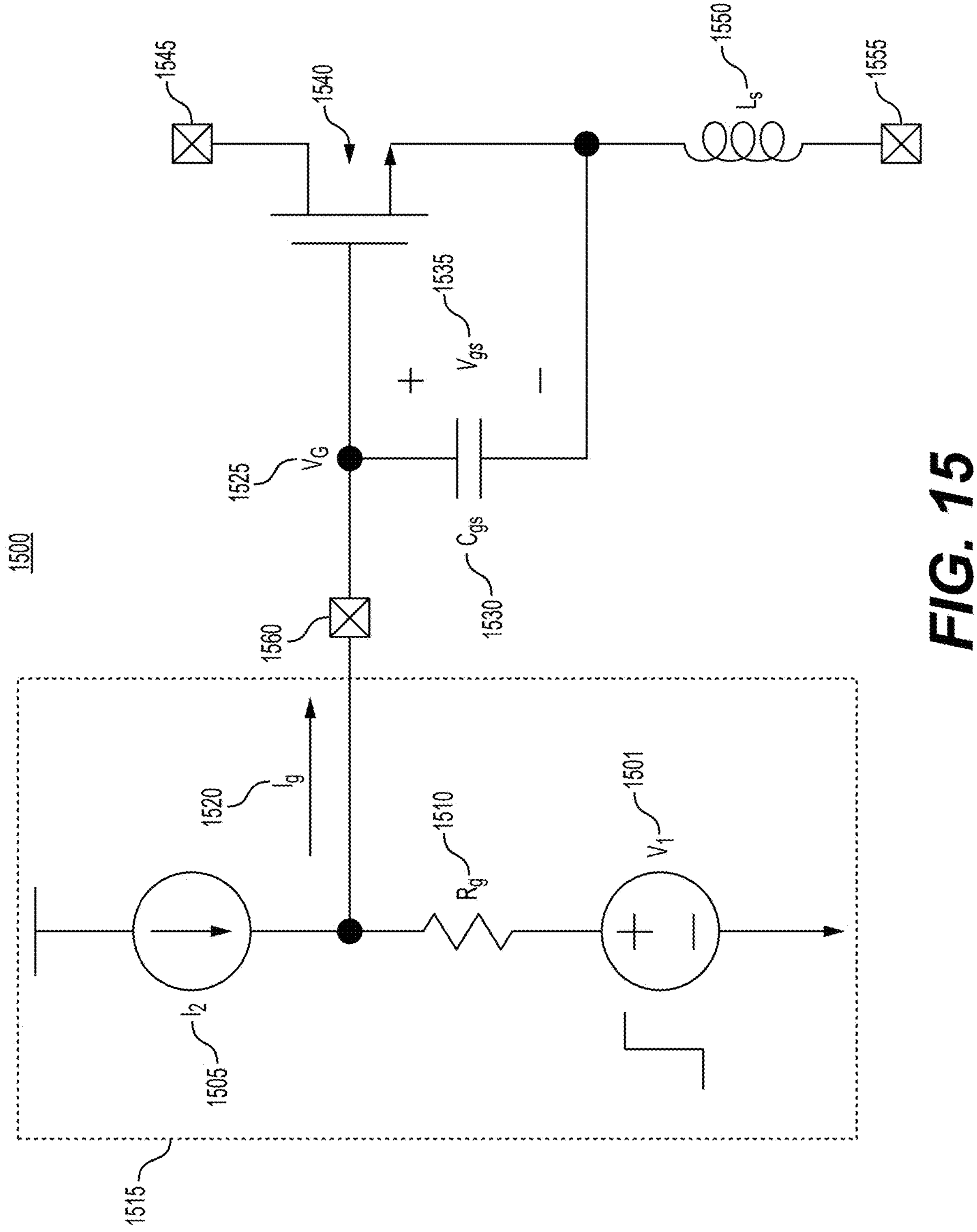
FIG. 15 depicts an exemplary system infrastructure for a hybrid switch driver, according to one or more embodiments.

For example, FIG. 15 may depict a simplified block diagram of the hybrid gate drivers. One or more embodiments may provide a voltage source, $V_1$, and resistor, $R_t$, and may comprise a resistor-based gate driver. One or more embodiments may provide a current source, $I_2$, which may model a high impedance variable current source.

One or more embodiments may provide an example turn-ON switching event is described next. For example, one or more embodiments may provide when $V_1$ is stepped from its lowest voltage, $V_L$, to its highest voltage, $V_H$, current hi equal to $(V_H-V_G)/R_g$ begins to flow into node $V_G$. One or more embodiments may provide that simultaneously, variable current source $I_2$ may turn on and may source current into $V_G$. One or more embodiments may provide that the summation of $I_1$ and $I_2$ may be $I_G$.

One or more embodiments may provide a turn-ON switching event. For example, FIG. 16 may depict an example time domain waveform of $I_1$ and $I_G$ for a turn-ON switching event. One or more embodiments may provide an algorithm which may determine the value of $I_2$ to add to $I_1$ to produce waveform $I_G$ and may provide one or more gate current profiles to switch the Power FET in a safe, efficient manner. One or more embodiments may provide that the impedance looking back into the driving circuit from the Power FET is approximately $R_G$. This value of $R_G$ may be arbitrary chosen which may minimize LC tank ringing, while a value of $I_2$ may be chosen to augment $I_1$ current to produce the $I_G$ current. One or more embodiments may provide a method to simultaneously reduce LC tank ringing and provide safe, efficient Power FET switching through gate current.

One or more embodiments may allow simultaneous independent control of the LC tank damping resistance which may limit ringing and may provide well-controlled switching dynamics ($dI_{DS}/dt$ and $dV_{DS}/dt$) to create safe and efficient Power FET operation.

FIG. 1 depicts an exemplary system infrastructure for a vehicle including a power converter, according to one or more embodiments. The power converter 100 may be a combined inverter and converter. Alternatively, the inverter may be an inverter without a converter. In the context of this disclosure, a battery charger, the inverter, the converter, or any combination thereof may be referred to as power converter 100. Electric vehicle 185 may include power converter 100, motor 190, and battery 140. Power converter 100 may include components to receive electrical power from an external source and output electrical power to charge battery 140 of electric vehicle 185. Power converter 100 may convert DC power from battery 140 in electric vehicle 185 to AC power, to drive motor 190 of the electric vehicle 185, for example, but the embodiments are not limited thereto. For example, power converter 100 may include components to receive electrical power from an external source and output electrical power to charge battery 140 without motor 190 connected to power converter 100. Power converter 100 may convert DC power from battery 140 in electric vehicle 185 to AC power, to drive AC components other than motor 190 of the electric vehicle 185. Power converter 100 may be bidirectional, and may convert DC power to AC power, or convert AC power to DC power, such as during regenerative braking, for example. Power converter 100 may be a three-phase inverter, a single-phase inverter, or a multi-phase inverter.

Figure 2:
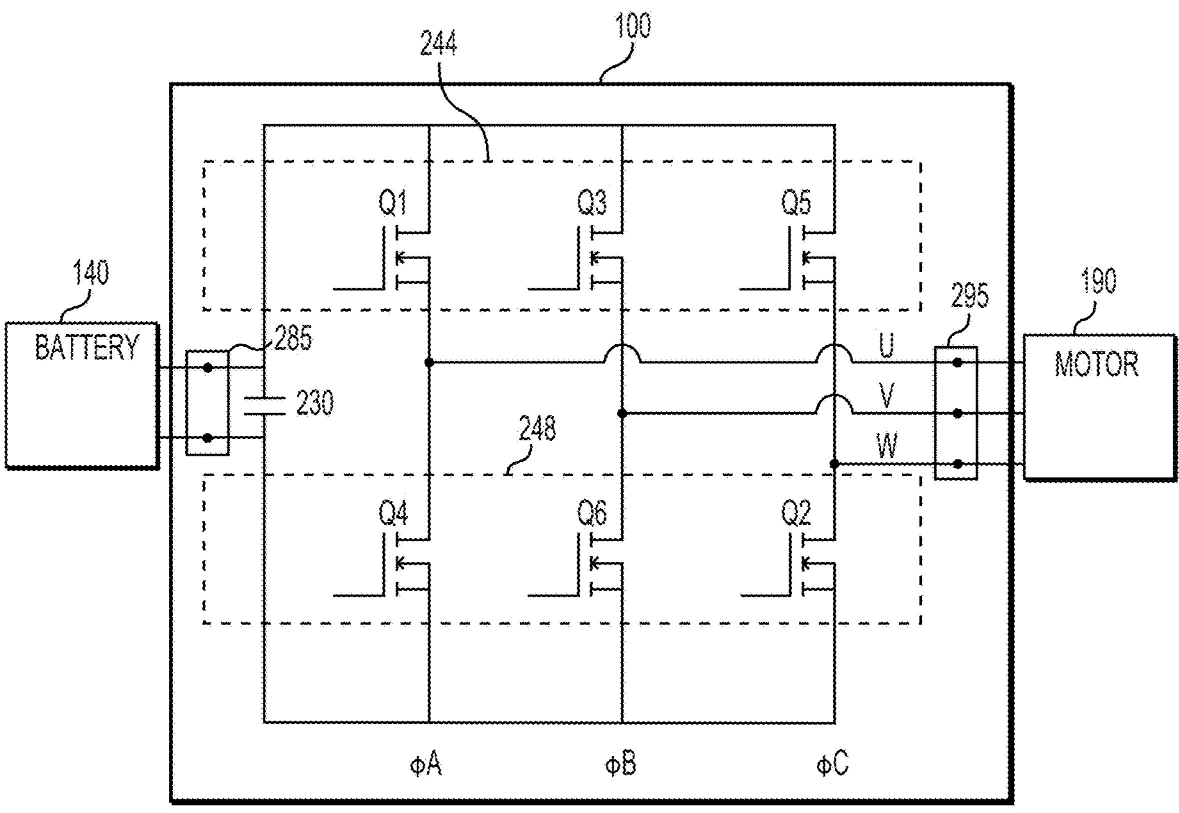
FIG. 2 depicts an exemplary system infrastructure for a power converter, according to one or more embodiments.

FIG. 2 depicts an exemplary system infrastructure for a power converter, according to one or more embodiments. Power converter 100 may be used to convert DC power from a battery in electric vehicle 185 to AC power, to drive motor 190 of electric vehicle 185, for example, but embodiments are not limited thereto. Additionally, power converter 100 may be bidirectional, and used to convert DC power to AC power, or to convert AC power to DC power.

Power converter 100 may be connected to battery 140 and motor 190. Power converter 100 may include upper phase switches 244 and lower phase switches 248. A first phase (A) may include switches Q1 and Q4, a second phase (@B) may include switches Q3 and Q6, and a third phase (@C) may include switches Q5 and Q2. Upper phase switches 244 may include first phase switch Q1, second phase switch Q3, and third phase switch Q5. Lower phase switches 248 may include first phase switch Q4, second phase switch Q6, and third phase switch Q2. Switches Q1-Q6 may be metal-oxide-semiconductor field-effect transistors (MOSFET), for example, but embodiments are not limited thereto.

Upper phase switches 244 and lower phase switches 248 may be driven by a pulse width modulated (PWM) signal generated by controller 300 (e.g., see FIG. 3) to convert DC power delivered via the set of input terminals 285 at bulk capacitor 230 to three phase AC power at outputs U, V, and W (correlating with phases A, B, and C, respectively) via the set of output terminals 295 to motor 190. Additionally, although FIG. 2 depicts a three-phase inverter, the disclosure is not limited thereto, and may include single phase or multi-phase or multi-level inverters.

Figure 3:
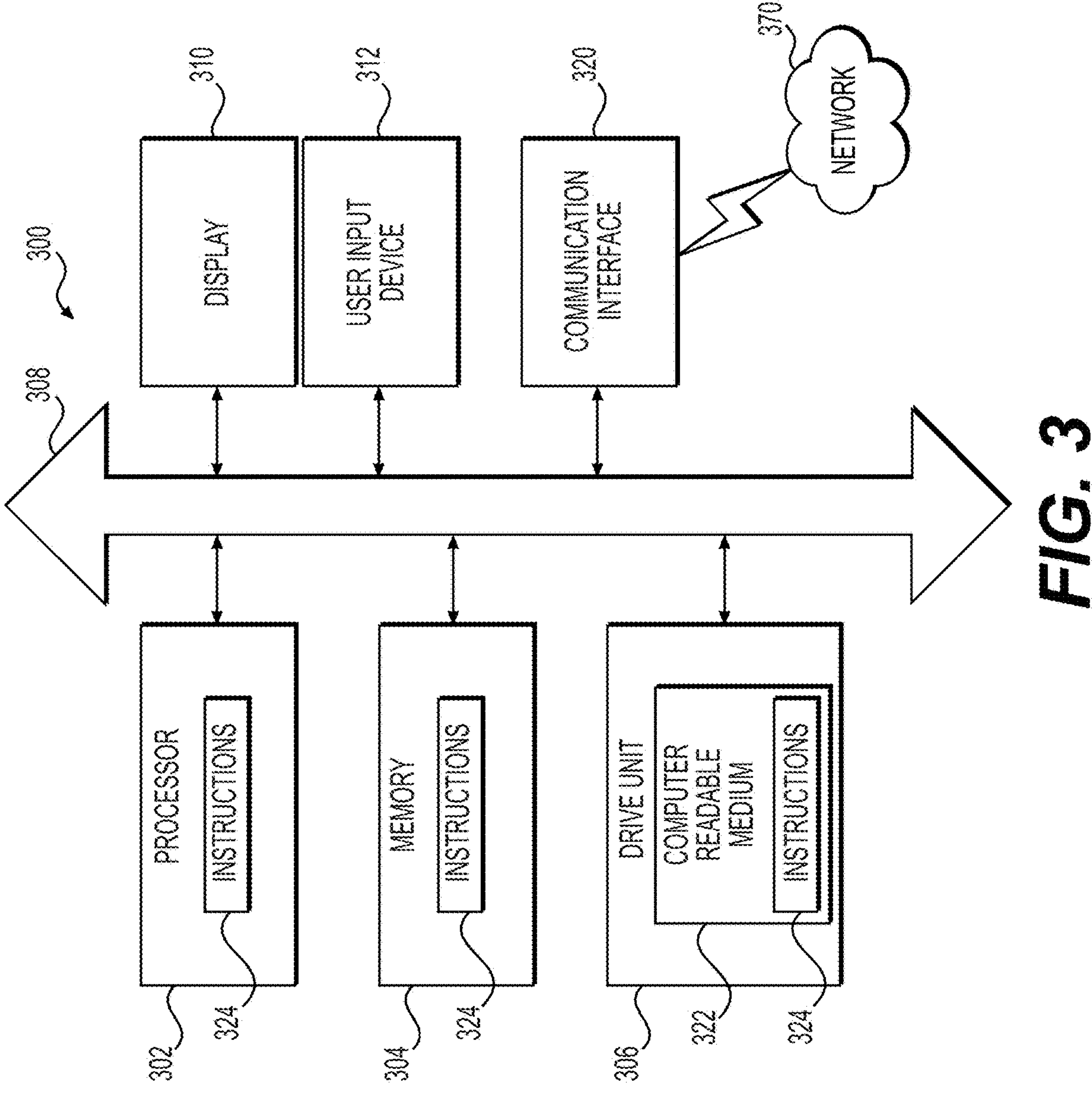
FIG. 3 depicts an exemplary system infrastructure for a controller, according to one or more embodiments.

FIG. 3 depicts an exemplary system infrastructure for a controller, according to one or more embodiments. Controller 300 may include one or more controllers.

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a power converter, a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As depicted in FIG. 3, the controller 300 may include a processor 302, e.g., a central processing unit (CPU), a graphics processing unit (GPU), or both. The processor 302 may be a component in a variety of systems. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As depicted, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is depicted to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
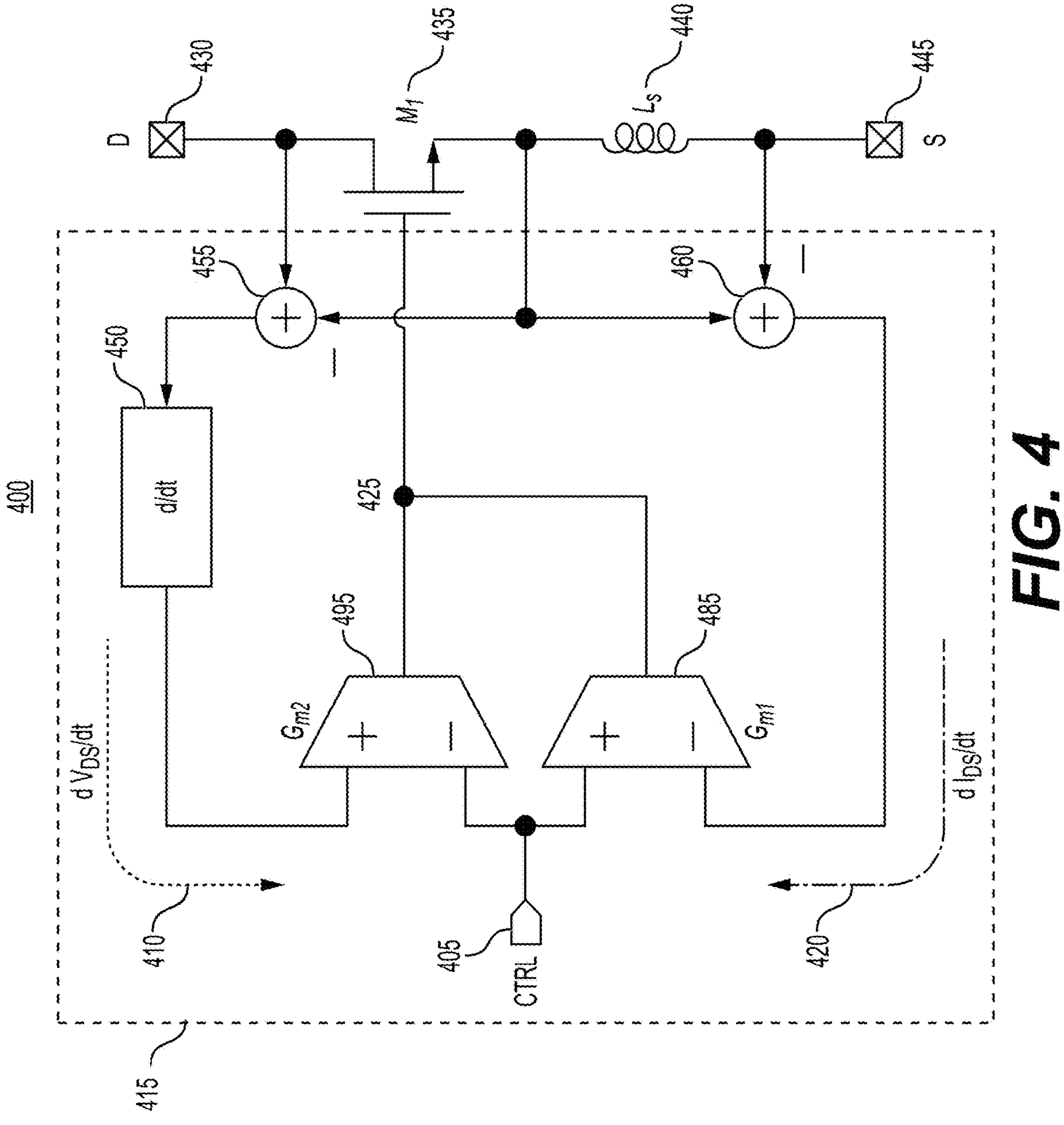
FIG. 4 depicts an exemplary system infrastructure for dual-loop feedback control, according to one or more embodiments.

FIG. 4 depicts an exemplary system infrastructure for dual-loop feedback control, according to one or more embodiments. System 400 may include dual-loop feedback control 415 and switch 435. Switch 435 may be a switch in power converter 100, for example, such as Q1 in upper phase switches 244. Dual-loop feedback control 415 may include input connection 405, voltage loop 410, current loop 420, current transconductor 485, voltage transconductor 495, voltage adder 455, current adder 460, and differentiator 450. Voltage loop 410 may include a voltage slew rate, a current slew rate, a current, or a voltage, for example. Current loop 420 may include a voltage slew rate, a current slew rate, a current, or a voltage, for example. Dual-loop feedback control 415 may include a switch driver configured to generate a control signal for switch 435. Dual-loop feedback control 415 may be implemented as software or as a hardware circuit. Switch 435 may include gate 425, drain 430, source 445, and inductor 440.

Input connection 405 may be connected to an input of voltage transconductor 495 and an input of current transconductor 485. An output of differentiator 450 may be connected to an input of voltage transconductor 495. A connection between switch 435 and inductor 440 may be connected to an input of voltage adder 455 and an input of current adder 460. Source 445 may be connected to an input of current adder 460. An output of current adder 460 may be connected to an input of current transconductor 485. Drain 430 may be connected to an input of voltage adder 455. An output of voltage adder 455 may be connected to an input of differentiator 450. An output of voltage transconductor 495 may be connected to gate 425 of switch 435. An output of current transconductor 485 may be connected to gate 425 of switch 435.

System 400 may use negative feedback to control an operation of switch 435. System 400 may generate one or more gate current profiles for operating in a wide range of environmental conditions, such as temperature or gate current, for example. In the context of this disclosure, a dual-loop feedback control profile may be a gate current profile, a gate voltage profile, or a gate driver profile, for example, that is generated using a dual-loop feedback control operation. For example, system 400 may generate one or more gate current profiles for operating with a wide range of conditions for battery voltage (which may include negative battery voltage), motor current, requested torque, or a number of switches, for example. System 400 may increase drain current and drain voltage slew rates, which may reduce switching losses.

Dual-loop feedback control 415 may control current loop 420 (e.g., second feedback loop) independently of voltage loop 410 (e.g., first feedback loop). Dual-loop feedback control 415 may generate a control signal (e.g., generated control signal) which may include a voltage signal based on the change in voltage (e.g., detected change) detected by voltage loop 410 and a current signal based on the change in current detected by current loop 420. Voltage loop 410 may be configured to generate a first feedback signal (e.g., a first feedback loop signal) based on a change in voltage detected by voltage loop 410. Current loop 420 may be configured to generate a second feedback signal (e.g., a second feedback loop signal) based on a change in current detected by current loop 420. The control signal generated by dual-loop feedback control 415 may include a combination of the first feedback control signal generated by voltage loop 410 and the second feedback signal generated by current loop 420. Dual-loop feedback control 415 may control one or more Turn ON profiles (e.g., turn-ON control profile) and one or more Turn OFF profiles (e.g., turn-OFF control profile).

FIG. 5 depicts exemplary regions of gate current profiles, according to one or more embodiments. Plots 500 includes plot 510 for a Turn-ON event and plot 530 for a Turn-OFF event for a current applied to gate 425 of switch 435, for example. Plot 510 includes a gate current 620 as a function of time including a first region 511, a second region 512, a third region 513, and a fourth region 514. In first region 511, gate current 620 may be driven to a plateau. In second region 512, one or more gate profiles may control an Ios (for example, drain-to-source current) slew rate, and drive the $I_{DS}$ toward a maximum value. In third region 513, one or more gate profiles may control a $V_{DS}$ slew rate, and drive the $V_{DS}$ toward a minimum value. In fourth region 514, gate current 620 may be driven to a full enhancement.

Plot 530 includes a gate current 620 as a function of time including a first region 531, a second region 532, a third region 533, and a fourth region 534. In first region 531, gate current 620 may be driven to a plateau. In second region 532, one or more gate profiles may control a $V_{DS}$ slew rate, and drive the $V_{DS}$ toward a maximum value. In third region 533, one or more gate profiles may control an Ios slew rate, and drive the $I_{DS}$ toward zero. In fourth region 534, gate current 620 may be driven to a full cut off.

Figure 6:
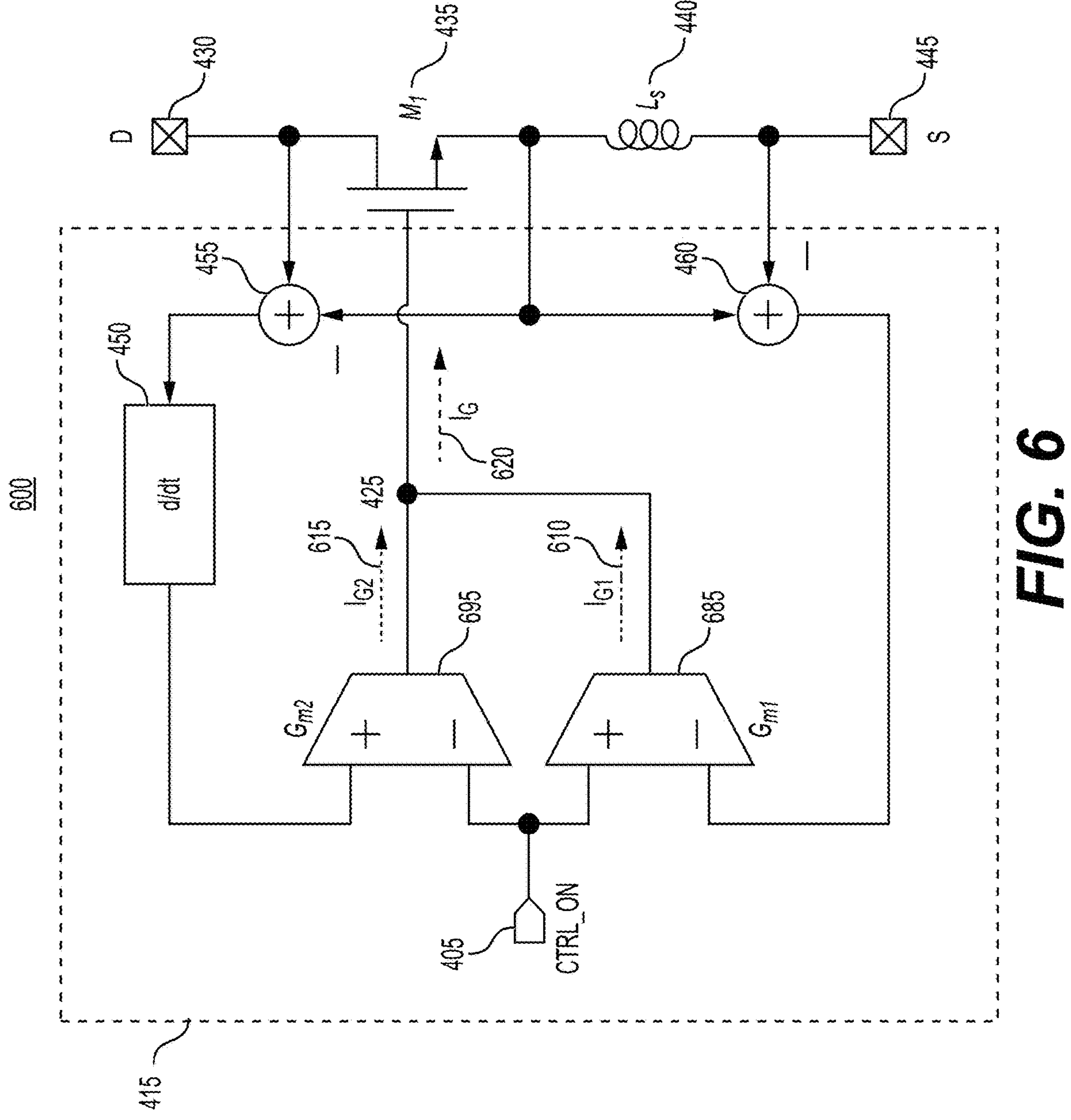
FIG. 6 depicts an exemplary turn-on operation of a switch driver, according to one or more embodiments.

FIG. 6 depicts an exemplary turn-ON operation of a switch driver, according to one or more embodiments. System 600 may include dual-loop feedback control 415 and switch 435. Dual-loop feedback control 415 may include input connection 405, current transconductor 685, and voltage transconductor 695, voltage adder 455, current adder 460, and differentiator 450. Switch 435 may include gate 425, drain 430, source 445, and inductor 440.

Input connection 405 may be connected to an input of voltage transconductor 695 and an input of current transconductor 685. An output of differentiator 450 may be connected to an input of voltage transconductor 695. Source 445 may be connected to an input of current adder 460. An output of current adder 460 may be connected to an input of current transconductor 685. Current transconductor 685 may output a first current signal 610. Voltage transconductor 695 may output a second current signal 615. Gate current 620 may be a combination of the first current signal 610 and the second current signal 615.

System 600 may include a turn-ON control for a turn-ON event. System 600 may be characterized by a set of initial conditions including an initial drain-source current equal to zero and an initial drain-source voltage equal or near-equal to battery voltage. Current transconductor 685 may include a source current range from zero to a maximum gate current value. Voltage transconductor 695 may include a source current range from a value equivalent to a negative maximum gate current value to zero.

Dual-loop feedback control 415 may include setting a voltage value at input connection 405 and may include setting the voltage value to a non-zero value. Dual-loop feedback control 415 may detect and feedback the voltage loop 410 and current loop 420 information. System 600 may include a drain-source current of switch 435 increasing from zero to a motor current, then may include a drain-source voltage of switch 435 decreasing from a battery voltage to a value equal to motor current multiplied by an on-event resistance of switch 435. Dual-loop feedback control 415 may limit a $dI_{DS}/dt$ and $dV_{DS}/dt$ of system 600 to one or more values.

FIG. 7 depicts exemplary current waveforms of the turn-on operation, according to one or more embodiments. Plot 700 includes graph 710, graph 715, and graph 720. Graph 710, graph 715, and graph 720 depict gate current waveforms for system 600. Graph 710 depicts values of a first current signal 610 as a function of time. Graph 715 depicts values of a second current signal 615 as a function of time. Graph 720 depicts values of a gate current 620 as a function of time. At a time 1, controller 300, for example, may assert a control signal, $dI_{DS}/dt$ and $dV_{DS}/dt$ may be equal to zero, first current signal 610 may be at a value $I_G$ (max), and second current signal 615 may be at a value zero. At a time 2, $V_{GS}$ (for example, gate-source voltage) may reach a plateau. Vas may be approximately the integral of I_G(t)/Ciss/dt from a time 0 to a time t, plus an initial Vas voltage, for example, $V_{GS}$ (0−). Vas may be calculated using Q=C*V (charge=capacitance*voltage), I=Q/t (current=charge/time), and the differential equation I=C*dV/dt. From a time 2 to a time 3, first current signal 610 may decrease, and $I_{DS}$ may drive towards a maximum value. Current transconductor 685 (for example, $G_{m1}$) may include an active feedback loop and may limit $dI_{DS}/dt$. At a time 3, $I_{DS}$ may reach a maximum value, first current signal 610 may reach a maximum value, and $V_{DS}$ may decrease. From a time 3 to a time 4, second current signal 615 may decrease, and $V_{DS}$ may drive towards a minimum value. Also, voltage transconductor 695 (for example, $G_{m2}$) may sink excess current from first current signal 610, and may limit $dV_{DS}/dt$. From a time 4 to a time 5, first current signal may reach a maximum value, and switch 435 (for example, $M_1$) may be driven to a full enhancement.

Figure 8:
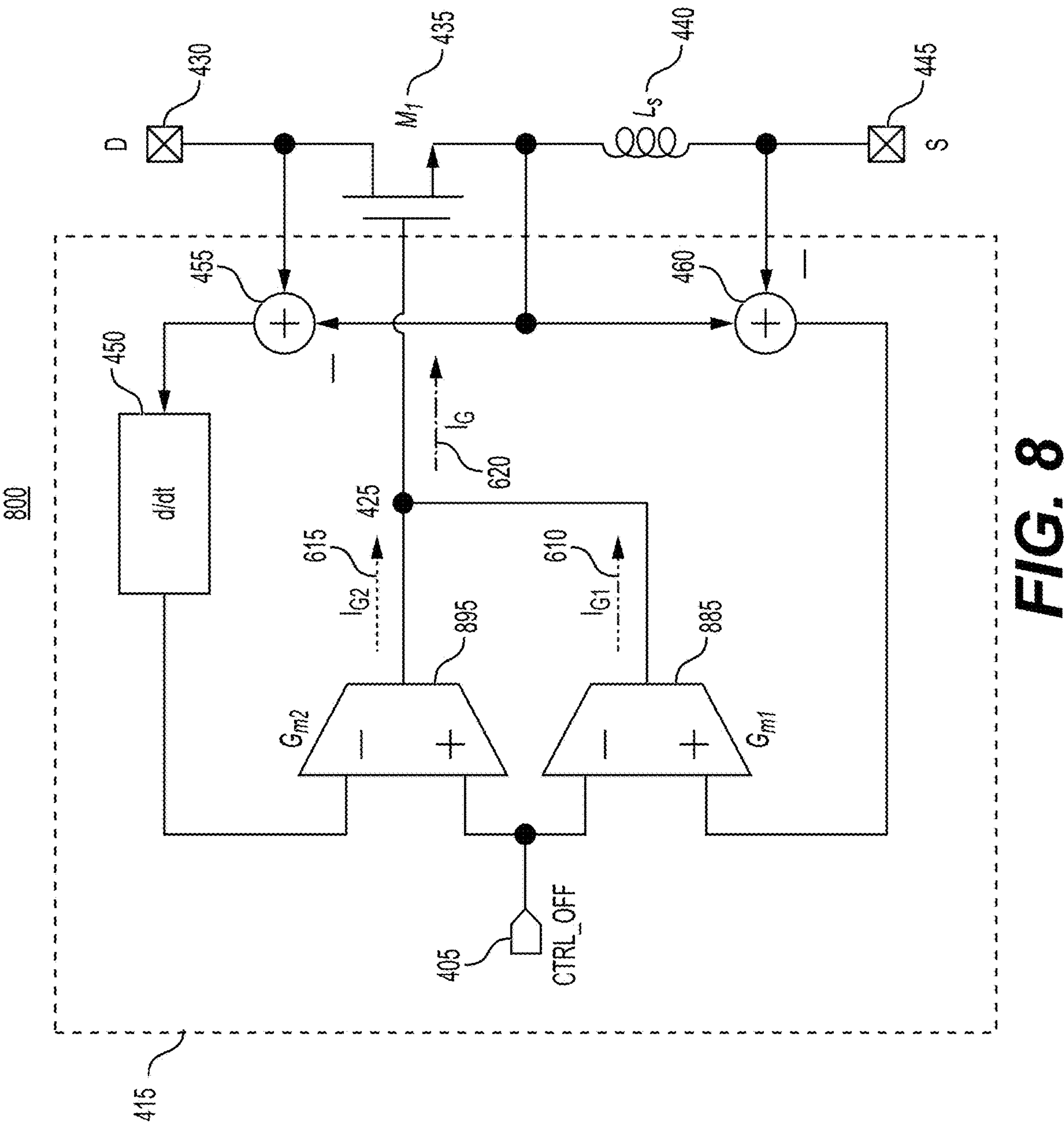
FIG. 8 depicts an exemplary turn-off operation of a switch driver, according to one or more embodiments.

FIG. 8 depicts an exemplary turn-off operation of a switch driver, according to one or more embodiments. System 800 may include system infrastructure for dual-loop feedback control, including dual-loop feedback control 415, input connection 405, and switch 435. Dual-loop feedback control 415 may include transconductor 885, and transconductor 895, voltage adder 455, current adder 460, and differentiator 450. Switch 435 may include gate 425, drain 430, source 445, and inductor 440. Input connection 405 may be connected to an input of transconductor 895 and transconductor 885, for example, input connection 405 may be connected to a positive input of transconductor 895 and connected to a negative input of transconductor 885. An output of differentiator 450 may be connected to a negative input of transconductor 895. Source 445 may be connected to current adder 460, and current adder 460 may be connected to a negative input of transconductor 885. Transconductor 885 may output a first current signal 610. Transconductor 895 may output a second current signal 615. Gate current 620 may be a combination of the first current signal 610 and the second current signal 615.

System 800 may include a Turn-OFF control for a turn-OFF event. System 800 may be characterized by a set of initial conditions including an $I_{DS}$ equal to a motor current, and a $V_{DS}$ equal to the motor current multiplied by an on-event resistance of switch 435. Transconductor 885 may include a source current range from a value equivalent to a negative maximum gate current value to zero. Transconductor 895 may include a source current range from zero to a maximum gate current value.

Dual-loop feedback control 415 may include setting a voltage value at input connection 405 and may include setting it to a zero value or a near-zero value. Dual-loop feedback control 415 may detect and feedback the voltage loop 410 and current loop 420 information. System 800 may include $V_{DS}$ increasing from a value equal to motor current multiplied by an on-event resistance to a value equal to battery voltage, and $I_{DS}$ may decrease from a current value equal to motor current down to a zero or near-zero value. Dual-loop feedback control 415 may limit a $dI_{DS}/dt$ and $dV_{DS}/dt$ of system 800 to one or more values.

Figure 9:
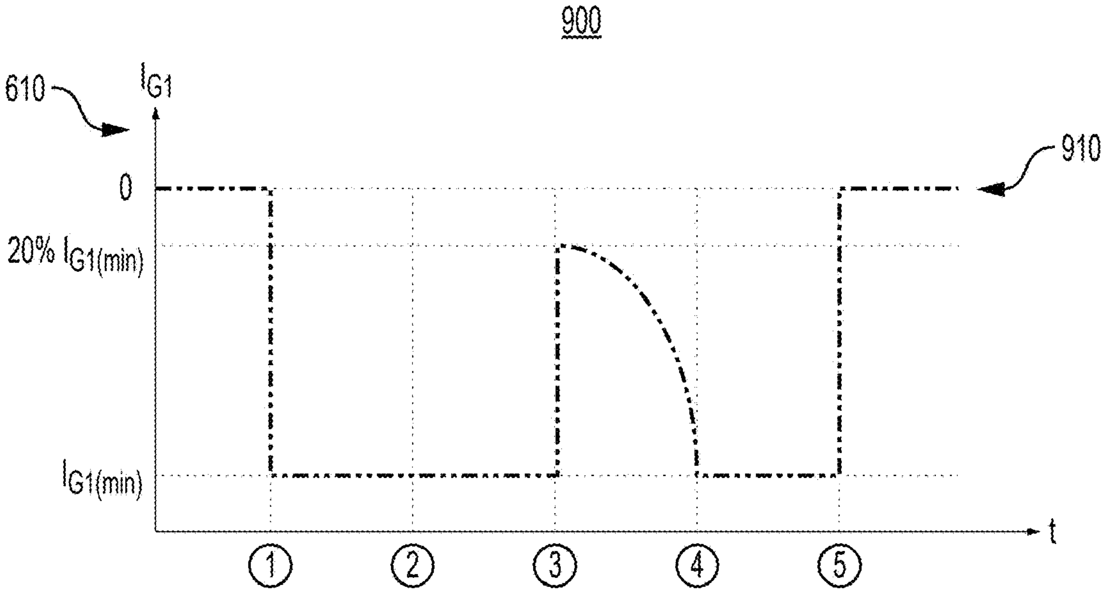
FIG. 9 depicts exemplary current waveforms of the turn-off operation, according to one or more embodiments.
Figure 9:
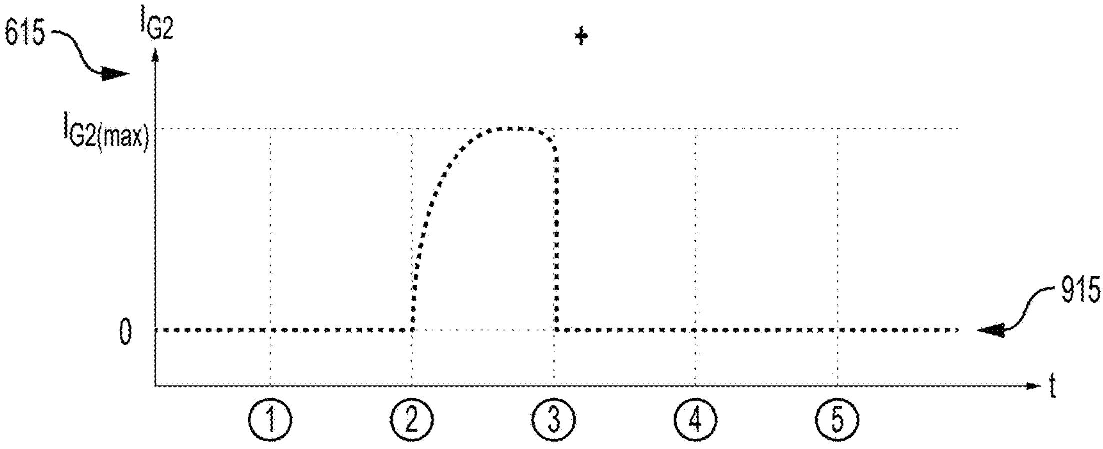
Figure 9:
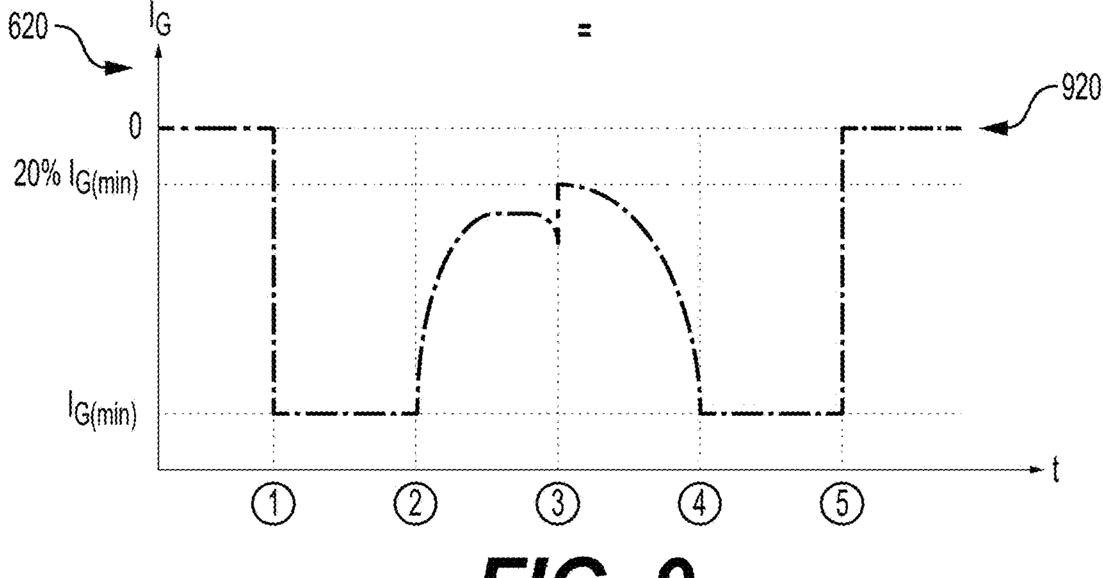

FIG. 9 depicts exemplary current waveforms of the turn-off operation, according to one or more embodiments. Plots 900 may include graph 910, graph 915, and graph 920. Plots 900 may include graphs depicting gate current waveforms for system 800. Graph 910 may include values of a first current signal 610. Graph 915 may include values of a second current signal 615. Graph 920 may include values of a gate current 620. At a time 1, a control signal may be asserted, $dI_{DS}/dt$ and $dV_{DS}/dt$ may be equal to zero, first current signal 610 may drive towards a minimum value, and second current signal 615 may be at a value zero. At a time 2, Vas (for example, a gate-source voltage of switch 435) may reach a plateau. From a time 2 to a time 3, first current signal 610 may be equal to a minimum value, second current signal 615 may increase, and transconductor 895 may source excess current from first current signal 610 and may limit $dV_{DS}/dt$. At a time 3, $V_{DS}$ may be equal to a maximum value, second current signal 615 may be equal to zero, and $I_{DS}$ (for example, a drain-source voltage of switch 435) may decrease. From a time 3 to a time 4, first current signal 610 may decrease and $I_{DS}$ may drive to a zero or near-zero value. Transconductor 885 (for example, $G_{m1}$) may include an active feedback loop and may limit $dI_{DS}/dt$. From a time 4 to a time 5, gate current 620 may be equal to a minimum value, and switch 435 (for example, $M_1$) may be driven to a full cutoff.

Figure 10:
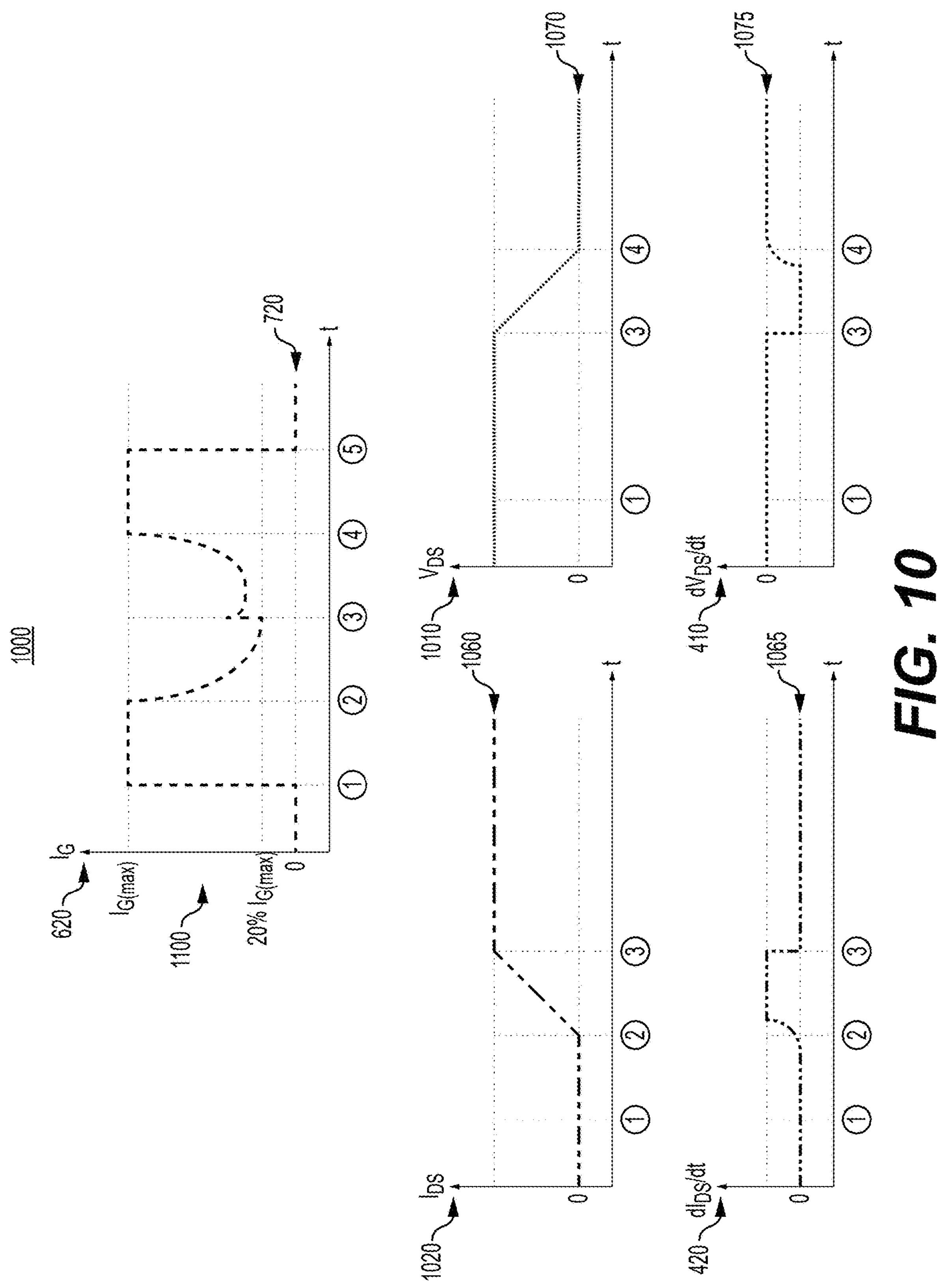
FIG. 10 depicts exemplary waveforms in a dual-loop feedback control, according to one or more embodiments.

FIG. 10 depicts exemplary waveforms in a dual-loop feedback control, according to one or more embodiments. Plots 1000 may include graph 720, graph 1060, graph 1065, graph 1070, and graph 1075. Plots 1000 may include first region 511, second region 512, third region 513, and fourth region 514. Graph 720 may include gate current 620, and plot 1100. Graph 1060 may include drain-source current 1020. Graph 1065 may include current loop 420. Graph 1070 may include drain-source voltage 1010. Graph 1075 may include voltage loop 410.

Plots 1000 may include results of one or more dual-loop feedback control, for example, dual-loop feedback control 415. First region 511 may include a time 1 to a time 2. First region may include driving to a plateau. Second region 512 may include a time 2 to a time 3. Second region 512 may include controlling current loop 420 (for example, $dI_{DS}/dt$). Third region 513 may include a time 3 to a time 4. Third region 513 may include controlling the voltage loop 410 (for example, $dV_{DS}/dt$). Fourth region 514 may include a time 4 to a time 5. Fourth region 514 may include driving to a full enhancement.

FIG. 11 depicts an exemplary slew current for the turn-ON operation, according to one or more embodiments. Plot 1100 may include graph 720 and gate current 620. Plot 1100 may include second region 512, which may include a time 2 to a time 3. Plot 1100 may include that for a turn-ON profile, time spent in a second region 512 may be proportional to power switch drain current (for example, Power FET drain current, or switch 435 drain current). For example, time spent in second region 512 may be proportional to $I_{DS}$. In second region 512, a time $t_2$ 1110 may include a time between a time 3 and a time 2. For a time $t_2$, $I_{DS}$ may be equal to a maximum value of $I_{DS}$. In second region 512, a time $t_1$ 1105 may include a time between a time 3' and a time 2, or $t_2$ 1110 divided by two (for example, $t_2/2$). For a time $t_1$, $I_{DS}$ may be equal to 0.5 multiplied by a maximum value of $I_{DS}$. Graph 720 may vary with FET (for example, switch 435) junction temperature, and the equation for gate current 620 may be simplified in second region 512.

FIG. 12 depicts an exemplary gate current and multiple drain currents, according to one or more embodiments. Plot 1200 may include gate current 620 in multiple regions and for multiple percentages of $I_{DS}$ (for example, drain source current of switch 435), and may include gate current 620 at a temperature of 175 degrees Celsius. Plot 1200 may include first region 511, second region 512, third region 513, and fourth region 514 (see FIG. 5). Plot 1200 may include gate current 620 for various percentages of maximum $I_{DS}$. Plot 1200 may include multiple curves for gate current 620 versus time for various drain currents.

Using a gate current transition from a second region 512 to a third region 513, an algorithm may be utilized to safely switch between second region 512 to third region 513 equations, which may include one or more dual-loop feedback controls, for example, dual-loop feedback control 415. For example, if gate current 620 at the end of second region 512 is higher than the gate current at the start of third region 513, and there may be uncertainty in actual drain current, the algorithm may switch to third region 513 earlier and may maintain a safe power switch operation (for example, safe operation of Power FET or safe operation of switch 435). Safe power switch operation may include, for example, maintaining a switch (for example, switch 435) within a tolerance specified by a manufacturer. Also, if the third region 513 gate current 620 at start is higher than second region 512 gate current 620, then a change to third region 513 may be delayed. Transition criteria may allow turn-ON $dI_{DS}/dt$ (for example, current loop 420 in second region 512) and turn-ON $dV_{DS}/dt$ (for example, voltage loop 410 in third region 513) may not exceed one or more safe limits. Safe limits may include, for example, $V_{DS}$ (maximum), $V_{GS}$ (maximum), maximum continuous drain current or pulsed drain current, or maximum junction temperature.

FIG. 13 depicts an exemplary gate current for multiple drain currents in a second region, according to one or more embodiments. Plot 1300 may include gate current 620 for a turned-ON event in a second region 512 for multiple drain current values. Plot 1300 may depict how gate current 620 remains consistent for any drain current. Plot 1300 may include gate current 620 at a temperature of 175 degrees Celsius and for various percentages of maximum $I_{DS}$.

FIG. 14 depicts an exemplary gate current and multiple drain currents in a third region, according to one or more embodiments. Plot 1400 may include gate current 620 for a turned-ON event in a third region 513 for multiple drain current values. Plot 1300 may depict that third region 513 equation coefficients may have strong dependence on drain current, and that time spent in third region 513 may be dependent on battery voltage (for example, battery voltage divided by voltage loop voltage, which may equal a constant value).

FIG. 15 depicts an exemplary system infrastructure for a hybrid gate driver, according to one or more embodiments. System 1500 may include hybrid gate driver 1515 and switch 1540. Hybrid gate driver 1515 may include voltage source 1501, current source 1505, and resistor 1510. Hybrid gate driver 1515 may produce a gate current 1520. Hybrid gate driver 1515 may include a control input. Voltage source 1501 and resistor 1510 may be a resistor-based driver, and current source 1505 may be a high impedance variable current source. Voltage source 1501 may produce a first voltage and a first current. Voltage source 1501 may be configured to provide a voltage control signal to the control input of switch 1540. Current source 1505 may produce a second voltage and a second current. Current source 1505 may be configured to provide a current control signal to the control input of switch 1540. Hybrid gate driver 1515 may generate a hybrid switch driver signal for switch 1540, which may include the current control signal provided by current source 1505 and the voltage control signal provided by voltage source 1501.

Switch 1540 may include gate 1560, gate voltage 1525, drain 1545, source 1555, inductor 1550, gate-source capacitor 1530, and gate-source voltage 1535. Hybrid gate driver 1515 may be connected to switch 1540. For example, current source 1505 may be connected to gate 1560, voltage source 1501 may be connected to resistor 1510, and resistor 1510 may be connected to gate 1560. Hybrid gate driver 1515 may include implementation of dual-loop feedback control 415.

System 1500 may depict a turn-ON switching event. For example, voltage source 1501 may be stepped from a lower voltage (for example, $V_L$) to a higher voltage (for example, $V_H$), and voltage source 1501 may produce a current $I_1$ (for example, the first current) equal to $(V_H-V_G)/R_g$ (where $R_g$ may be a resistance of resistor 1510). Current $I_1$ may begin to flow into node $V_G$ (for example, gate voltage 1525). At the same time current source 1505 may turn on, and may source current (for example, the second current) into node $V_G$ (for example, gate voltage 1525). A summation of current $I_1$ and $I_2$ (for example, first current and second current) may be a gate current 1520. Resistor 1510 may include a resistance value which is equal to an impedance looking back into a driving circuit from a switch (for example, a power FET). A resistance value of resistor 1510 may be chosen to reduce inductor-capacitor (LC) tank ringing, and the value of second current produced by current source 1505 may be chosen to augment first current produced by voltage source 1501 which may produce gate current 1520.

Figure 16:
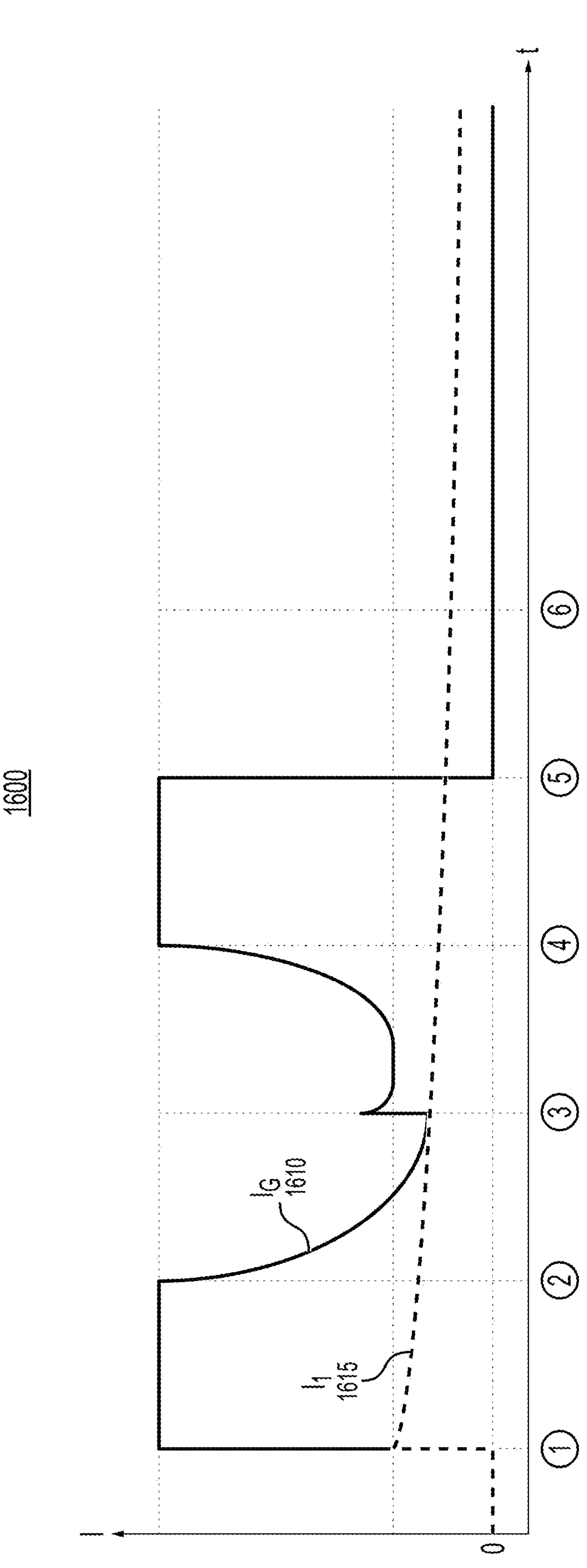
FIG. 16 depicts exemplary turn-on switching waveforms of the hybrid switch driver, according to one or more embodiments.

FIG. 16 depicts exemplary turn-on switching waveforms of the hybrid gate driver, according to one or more embodiments. Plot 1600 may include gate current 1610 and a first current 1615. Plot 1600 may include a time domain waveform of a first current source and gate current 1520 for a turn-ON switching event, which may be depicted in system 1500. For example, first current source of system 1500 may be first current 1615 and gate current 1520 may be gate current 1610. An algorithm may determine values of a second current to add to first current 1615, may produce a waveform which may include gate current 1610, and may provide one or more gate current profiles which may activate a switch (for example, a power FET) in a safe and efficient manner.

One or more embodiments may provide gate current for any FET operating condition, decreased switching times, and decreased overlap of $I_{DS}$ and $V_{DS}$ conduction, which may significantly reduce switching losses, and may increase an ability to maintain FET safe operating regions. One or more embodiments may provide a compact system to determine gate currents with region and time dependent equations (polynomial, piece-wise linear, or other appropriate fit equations) to efficiently, safely, and optimally switch Power FETs over widely varying operating conditions. One or more embodiments may allow simultaneous independent control of the LC tank damping resistance which may limit ringing and may provide well-controlled switching dynamics ($dI_{DS}/dt$ and $dV_{DS}/dt$) to create safe and efficient Power FET operation.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising a power converter, wherein the power converter includes:

a switch; and one or more controllers configured to control an operation of the switch;

wherein the one or more controllers include:

a first feedback loop configured to detect a change in voltage of the switch, wherein the first feedback loop includes a first transconductor configured to output a first current signal based on the change in voltage detected by the first feedback loop;

a second feedback loop configured to detect a change in current of the switch, wherein the second feedback loop includes a second transconductor configured to output a second current signal based on the change in current detected by the second feedback loop; and a switch driver configured to generate a control signal for the switch, wherein the control signal includes a combination of the first current signal and the second current signal.

2. The system of claim 1, wherein the control signal includes:

a voltage signal based on the change in voltage detected by the first feedback loop, and a current signal based on the change in current detected by the second feedback loop.

3. The system of claim 1, wherein the one or more controllers are further configured to generate a dual-loop feedback control profile for the switch based on the control signal for the switch.

4. The system of claim 3, wherein the dual-loop feedback control profile includes:

a first region signal;

a second region signal;

a third region signal; and a fourth region signal.

5. The system of claim 4, wherein:

the first region signal is configured to drive a current to a first plateau, the second region signal is configured to control a current slew rate, the third region signal is configured to control a voltage slew rate, and the fourth region signal is configured to drive the current to a second plateau.

6. The system of claim 4, wherein:

the first region signal is configured to drive a current to a first plateau, the second region signal is configured to control a voltage slew rate, the third region signal is configured to control a current slew rate, and the fourth region signal is configured to drive the current to a second plateau.

7. The system of claim 1, further comprising:

a battery connected to the power converter; and a motor connected to the power converter, wherein the system is provided as an electric vehicle.

8. The system of claim 1, wherein the second transconductor is configured to sink excess current from the first current signal to limit a rate of change of voltage of the switch.

9. The system of claim 1, wherein an output of the first transconductor and an output of the second transconductor are each connected to a gate of the switch.

10. A system comprising one or more controllers, the one or more controllers including:

a first feedback loop configured to detect a change in voltage of a switch, wherein the first feedback loop includes a first transconductor configured to output a first current signal based on the change in voltage detected by the first feedback loop;

a second feedback loop configured to detect a change in current of the switch, wherein the second feedback loop includes a second transconductor configured to output a second current signal based on the change in current detected by the second feedback loop; and a switch driver configured to generate a control signal for the switch, wherein the control signal includes a combination of the first current signal and the second current signal.

11. The system of claim 10, wherein one or more of the first feedback loop, the second feedback loop, and the switch driver are implemented as software in the one or more controllers.

12. The system of claim 10, wherein one or more of the first feedback loop, the second feedback loop, and the switch driver are implemented as a hardware circuit including one or more of a transconductor, a differentiator, or an adder.

13. The system of claim 12, wherein:

the first feedback loop includes a first adder connected to the differentiator, and a first transconductor connected to the differentiator, and the second feedback loop includes a second adder connected to a second transconductor.

14. A method comprising:

generating, by a first transconductor of a first feedback loop, a first current signal based on a change in voltage of a switch;

generating, by a second transconductor of a second feedback loop, a second current signal based on a change in current of the switch; and generating a control signal for the switch, wherein the control signal includes a combination of the first current signal and the second current signal.

15. The method of claim 14, further comprising:

detecting a change in voltage signal in response to the generated control signal;

detecting a change in current signal in response to the generated control signal;

generating the first current signal in response to the generated control signal and the detected change in current signal; and generating the second current signal in response to the generated control signal and the detected change in voltage signal.

16. The method of claim 14, further comprising:

generating a dual-loop feedback control profile for the switch based on the control signal.

17. The method of claim 16, wherein the generating the dual-loop feedback control profile includes generating a turn-on control profile for the switch and generating a turn-off control profile for the switch.

18. The method of claim 14, wherein the generating the control signal includes generating a first region signal, generating a second region signal, generating a third region signal, and generating a fourth region signal.

19. The method of claim 18, wherein:

the generating the first region signal includes generating a control signal to drive the current of the switch to a first plateau, the generating the second region signal includes generating a control signal to control a first voltage slew rate and a first current slew rate of the switch, the generating the third region signal includes generating a control signal to control a second voltage slew rate and a second current slew rate of the switch, and the generating the fourth region signal includes generating a control signal to drive the current of the switch to a second plateau.

20. The method of claim 14, wherein the first transconductor includes a source current range from zero to a maximum gate current value, and the second transconductor includes a source current range from a negative maximum gate current value to zero.

* * * * *